United States Patent
Huang

(10) Patent No.: US 10,666,336 B2
(45) Date of Patent: May 26, 2020

(54) INTER-DEVICE COORDINATION METHOD, BEAM TRAINING METHOD, AND APPARATUS

(71) Applicant: HUAWEI TECHNOLOGIES CO., LTD., Shenzhen, Guangdong (CN)

(72) Inventor: Yada Huang, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/974,278

(22) Filed: May 8, 2018

(65) Prior Publication Data

US 2018/0254809 A1 Sep. 6, 2018

Related U.S. Application Data

(63) Continuation of application No. PCT/CN2016/101312, filed on Sep. 30, 2016.

(30) Foreign Application Priority Data

Nov. 9, 2015 (CN) .......................... 2015 1 0759382

(51) Int. Cl.
*H04B 7/06* (2006.01)
*H04J 11/00* (2006.01)
(Continued)

(52) U.S. Cl.
CPC ............. *H04B 7/063* (2013.01); *H04B 7/024* (2013.01); *H04B 7/0695* (2013.01);
(Continued)

(58) Field of Classification Search
CPC .. H04B 7/0632; H04B 7/0417; H04B 7/0619; H04B 7/0408; H04B 7/0617; H04B 7/0695; H04W 16/28
(Continued)

(56) References Cited

U.S. PATENT DOCUMENTS

2010/0202308 A1 8/2010 Gorokhov et al.
2012/0027108 A1 2/2012 Hong et al.
(Continued)

FOREIGN PATENT DOCUMENTS

CN 101877608 A 11/2010
CN 102122977 A 7/2011
(Continued)

OTHER PUBLICATIONS

International Search Report dated Dec. 21, 2016 in corresponding International Patent Application No. PCT/CN2016/101312.
(Continued)

*Primary Examiner* — Leila Malek
(74) *Attorney, Agent, or Firm* — Womble Bond Dickinson (US) LLP

(57) ABSTRACT

A method in the embodiments of the present invention includes: sending, by a first device, a first beam to a target terminal; sending, by a second device, a second beam to the target terminal; measuring, by the target terminal, the received first beam and second beam; and if a first measurement quantity and a second measurement quantity meet a preset condition, sending, by the target terminal, a notification message to the first device, to instruct the first device to perform transmission coordination with the second device, so that the second device adjusts the second beam to reduce interference from the second beam to the first beam.

6 Claims, 9 Drawing Sheets

(51) Int. Cl.
    *H04B 7/024*     (2017.01)
    *H04W 52/42*     (2009.01)
    *H04W 92/20*     (2009.01)

(52) U.S. Cl.
    CPC ......... *H04J 11/0053* (2013.01); *H04W 52/42* (2013.01); *H04B 7/0617* (2013.01); *H04W 92/20* (2013.01)

(58) Field of Classification Search
    USPC ....................................................... 375/267
    See application file for complete search history.

(56) References Cited

U.S. PATENT DOCUMENTS

| | | |
|---|---|---|
| 2013/0065622 A1 | 3/2013 | Hwang |
| 2014/0146782 A1* | 5/2014 | Gerlach ............ H04W 72/0426 370/329 |
| 2015/0016434 A1 | 1/2015 | Luo et al. |
| 2015/0103784 A1 | 4/2015 | Lorca Hernando et al. |
| 2016/0269087 A1* | 9/2016 | Subramanian ......... H04B 7/024 |
| 2018/0262263 A1 | 9/2018 | Chang et al. |

FOREIGN PATENT DOCUMENTS

| | | |
|---|---|---|
| CN | 103155437 A | 6/2013 |
| CN | 103178886 A | 6/2013 |
| CN | 103369539 A | 10/2013 |
| CN | 103688583 A | 3/2014 |
| CN | 103703855 A | 4/2014 |
| CN | 103931109 A | 7/2014 |
| CN | 104918260 A | 9/2015 |
| EP | 2254261 A2 | 11/2010 |
| WO | 2010/088662 A3 | 10/2010 |
| WO | 2011/005045 A3 | 4/2011 |
| WO | 2015032437 A1 | 3/2015 |

OTHER PUBLICATIONS

Partial Supplementary European Search Report, dated Sep. 25, 2018, in European Application No. 16863509.2 (21 pp.).

* cited by examiner

INTER-DEVICE COORDINATION METHOD, BEAM TRAINING METHOD, AND APPARATUS

CROSS-REFERENCE TO RELATED APPLICATIONS

This application is a continuation of International Application No. PCT/CN2016/101312, filed on Sep. 30, 2016, which claims priority to Chinese Patent Application No. 201510759382.0, filed on Nov. 9, 2015, The disclosures of the aforementioned applications are hereby incorporated by reference in their entireties.

TECHNICAL FIELD

The present invention relates to the communications field, and in particular, to an inter-device coordination method, an interference determining method, a beam training method, and an apparatus.

BACKGROUND

A conventional operating frequency band in conventional mobile communication is mainly a frequency band lower than 3 GHz, and spectrum resources are extremely crowded. However, on a high frequency band (such as a millimeter-wave or centimeter-wave band), there are rich available spectrum resources, spectrum resource shortage can be effectively relieved, and extremely high-speed short-range communication can be implemented. Therefore, it can be considered that mining and application of high-frequency band resources are a development trend of future mobile communication. A beamforming (BF) technology is widely used in high-frequency cells for coverage enhancement. The beamforming technology is a technology that performs weighted processing on each physical antenna based on an adaptive antenna principle and by using an antenna array and an advanced signal processing algorithm. From a perspective of a receive end, the entire antenna array is equivalent to one virtual antenna. After weighted processing is performed, the antenna array forms a narrow transmit beam that aims at a target terminal, and forms a null in a direction in which the received end is interfered with, to reduce interference.

Inter-cell interference is an important issue in a cellular communications network. In the prior art, an inter-cell interference coordination (ICIC) technology is usually used to resolve inter-cell interference. The ICIC technology is used to allocate resources between cells. A cell-center user may use resources of all frequency bands, but cell-edge users in adjacent cells use resources of different frequency bands. In this way, interference between adjacent cells can be avoided, and cell spectrum efficiency can be improved.

It may be understood that, in the ICIC technology, it is configured that edge-users in adjacent cells use inter-frequency resources, to avoid interference between the adjacent cells. However, in the beamforming technology, to aim at the target terminal, the transmit beam formed by the antenna array dynamically traces a location of the target terminal, and the transmit beam may trace the target terminal from a cell-center location to a cell-edge location, or even trace the target terminal to a neighboring cell. In this case, it cannot be ensured that cell-edge users in adjacent cells use resources of different frequencies. Therefore, in the high-frequency cell in which the beamforming technology is used, the ICIC technology has already been incapable of effectively coordinating interference between cells, and the prior art provides no method for effectively coordinating interference between high-frequency cells, either.

SUMMARY

Embodiments of the present invention provide an inter-device coordination method, to coordinate interference between high-frequency cells. The embodiments of the present invention further provide a related beam training method, and a related apparatus, device, terminal, and system. The method, the apparatus, the device, the terminal, and the system provided in the present invention are applied to a wireless communications system. The wireless communications system includes a target terminal, a first device that provides a service for the target terminal, and a second device.

A first aspect of the present invention provides an inter-device coordination method. Specifically, a first device sends a first beam to a target terminal, and then receives a notification message sent by the target terminal. The notification message is used to indicate that the first beam is interfered with by a second beam sent by a second device, and the notification message includes identifier information of the second beam. After receiving the notification message, the first device sends a coordination message to the second device according to the notification message by using an interface between the first device and the second device, to perform transmission coordination to reduce interference from the second beam to the first beam. The coordination message is used to request to perform transmission coordination with the second device, and the coordination message includes the identifier information of the second beam. In the present invention, after the method is implemented, the first device can determine an interfering beam, and further can coordinate with the second device for the interfering beam, to reduce interference caused by the interfering beam. In addition, in the method provided in this embodiment of the present invention, the interference is reduced by means of coordination among the first device, the target terminal, and the second device, without statically configuring that edge-users in adjacent cells use inter-frequency resources. Therefore, inter-device interference coordination can be implemented in high-frequency cells.

Optionally, the coordination message may further include information about a resource used on the first beam. In this way, after receiving the coordination message, the second device may reduce, on the second beam, use of the resource used on the first beam, without greatly reducing a power of the second beam, so that the second beam can still normally serve another terminal.

A second aspect of the present invention provides an inter-device coordination method, including the following steps: A second device sends a second beam to a target terminal, where the second beam carries identifier information of the second beam; the second device receives coordination information from a first device, where the coordination information is used to request to perform transmission coordination with the second device, and the coordination information includes the identifier information of the second beam; and after receiving the coordination information, the second device may learn that the second beam causes interference to the target terminal, and the second device adjusts the second beam according to the coordination message, to perform transmission coordination with the first device to reduce the interference from the second beam to the target terminal. In the present invention, after the method is implemented, the second device can determine that an interfering beam is the second beam, and further can reduce the interference to the target terminal by adjusting only the second beam, without adjusting all beams and statically configuring that edge-users in adjacent cells use inter-frequency resources. Therefore, inter-device interference coordination can be implemented in high-frequency cells.

Optionally, a method in which the second device adjusts the second beam according to the coordination message may be one or more of the following methods: reducing a power of the second beam according to the coordination message; disabling the second beam according to the coordination message; or when the coordination message further includes information about a resource used on a first beam, reducing, on the second beam according to the coordination message, use of the resource used on the first beam.

A third aspect of the present invention provides an inter-device coordination method, including the following steps: A target terminal receives a first beam sent by a first device and a second beam sent by a second device; the target terminal measures the first beam, to obtain a first measurement quantity, and measures the second beam, to obtain a second measurement quantity, where the second beam includes identifier information of the second beam; and if the first measurement quantity and the second measurement quantity meet a preset condition, the target terminal determines that the second beam causes interference to the first beam, and the target terminal sends a notification message to the first device, where the notification message includes the identifier information of the second beam. After the method is implemented, the first device can learn that an interfering beam is the second beam, and further perform transmission coordination with the second device only for the second beam, without performing interference coordination for all beams and statically configuring that edge-users in adjacent cells use inter-frequency resources. Therefore, inter-device interference coordination can be implemented in high-frequency cells.

Optionally, the preset condition may include one or more of the following conditions: The first measurement quantity is less than a first preset value; the second measurement quantity is greater than a second preset value; or a difference between the first measurement quantity and the second measurement quantity is less than a third preset value.

Optionally, the first beam may include any one of the following beams: any one beam in polling beams that are received by the target terminal and are sent by the first device, a beam that has best signal quality in polling beams that are received by the target terminal and are sent by the first device, a specified beam in polling beams that are received by the target terminal and are sent by the first device, or a set of a plurality of polling beams that are received by the target terminal and are sent by the first device, where in this case, the first measurement quantity is an average value of measurement quantities of beams in the first beam.

A fourth aspect of the present invention provides a beam training method, including: receiving, by a second device from a target terminal, a request message used to request to perform beam training with the second device; and after receiving the request message, performing beam training with the target terminal. In the present invention, after the method is implemented, the target terminal and the second device can determine an interfering beam by means of beam training, to help a first device and the second device perform transmission coordination only for the interfering beam.

Optionally, the second device may determine, according to a result of the training with the target terminal, identifier information of the interfering beam that causes interference to the target terminal, to determine the interfering beam.

Optionally, a method in which the second device determines the identifier information of the interfering beam may be one or more of the following methods: determining a transmit angle for transmitting the interfering beam; determining a transmit matrix for transmitting the interfering beam; or determining identifier information of the target terminal that receives the interfering beam. Alternatively, the second device may directly receive the identifier information of the interfering beam from the target terminal, and specifically, the second device may receive a first advertisement message from the target terminal, where the first advertisement message includes the identifier information of the interfering beam.

Optionally, after determining the identifier information of the interfering beam, the second device may adjust the interfering beam according to the identifier information of the interfering beam, to perform transmission coordination with the first device for the interfering beam.

Optionally, a method in which the second device adjusts the interfering beam may be one or more of the following methods: reducing a power of the interfering beam; disabling the interfering beam; or when the first device communicates with the target terminal by using a serving beam, determining, from the first device, information about a resource used on the serving beam, and reducing, on the interfering beam, use of the resource used on the serving beam.

A fifth aspect of the present invention provides a beam training method, including: sending, by a target terminal to a second device, a request message used to request to perform beam training with the second device; and after sending the request message and the second device receives the request message, performing beam training with the second device.

Optionally, a condition for triggering, by the target terminal, the step of sending a request message to a second device may include one or more of the following conditions: The target terminal measures a serving beam, to obtain a service measurement quantity, where the service measurement quantity is less than a first preset value; the target terminal measures a received beam sent by the second device, to obtain an interference measurement quantity, where the interference measurement quantity is greater than a second preset value; the target terminal measures a serving beam, to obtain a service measurement quantity, and measures a received beam sent by the second device, to obtain an interference measurement quantity, where a difference between the service measurement quantity and the interference measurement quantity is less than a third preset value; or the target terminal receives an indication message sent by a first device, where the indication message is used to instruct the target terminal to perform beam training with the second device.

Optionally, the target terminal may determine, according to a result of the beam training with the second device, identifier information of an interfering beam that causes interference to the target terminal.

Optionally, a method in which the target terminal determines the interfering beam may be one or more of the following methods: determining a receiving angle at which the target terminal receives the interfering beam; determining a precoding matrix indicator PMI of the interfering beam; or determining identifier information of the target terminal. After the interfering beam is determined, the identifier information of the interfering beam can be determined. Alternatively, the target terminal may directly receive the identifier information of the interfering beam from the second device.

Optionally, after determining the identifier information of the interfering beam, the target terminal may instruct the first device to perform transmission coordination with the second device. Specifically, the target terminal may send a first advertisement message to the second device, where the first advertisement message includes identifier information of the first device and the identifier information of the interfering beam. Alternatively, the target terminal may send a second advertisement message to the first device, where the second advertisement message includes identifier information of the second device and the identifier information of the interfering beam.

A sixth aspect of the present invention provides an inter-device coordination method, including: receiving, by a first device, a first advertisement message sent by a target terminal, where the first advertisement message includes identifier information of a second device and identifier information of an interfering beam that causes interference to the target terminal; and sending, by the first device to the second device according to the first notification message, a coordination message that is used to request to perform transmission coordination with the second device, where the coordination message includes the identifier information of the interfering beam.

Optionally, the first device provides a service for the target terminal by using a serving beam, and the coordination message may further include information about a resource used on the serving beam.

A seventh aspect of the present invention provides an inter-device coordination apparatus, applied to a first device in a wireless communications system and including: a signal transmission module, configured to send a first beam to a target terminal; and a signal receiving module, configured to receive a notification message sent by the target terminal, where the notification message is used to indicate that the first beam is interfered with by a second beam sent by a second device, and the notification message includes identifier information of the second beam, where the signal transmission module is further configured to send, to the second device according to the notification message, a coordination message that is used to request to perform transmission coordination with the second device, where the coordination message includes the identifier information of the second beam. The inter-device coordination apparatus provided in the present invention can determine an interfering beam, and further can coordinate with the second device for the interfering beam, to reduce interference caused by the interfering beam, without statically configuring that edge-users in adjacent cells use inter-frequency resources. Therefore, inter-device interference coordination can be implemented in high-frequency cells.

Optionally, the coordination message may further include information about a resource used on the first beam. In this way, after receiving the coordination message, the second device may reduce, on the second beam, use of the resource used on the first beam, without greatly reducing a power of the second beam, so that the second beam can still normally serve another terminal.

An eighth aspect of the present invention provides an inter-device coordination apparatus, applied to a second device in a wireless communications system and including: a signal transmission module, configured to send a second beam to a target terminal, where the second beam carries identifier information of the second beam; a signal receiving module, configured to receive a coordination message from a first device, where the coordination message includes the identifier information of the second beam, and the coordination message is used to indicate that the first device requests to perform transmission coordination with the second device; and a transmission coordination module, configured to adjust the second beam according to the coordination message, to perform transmission coordination with the first device. The inter-device coordination apparatus provided in the eighth aspect of the present invention can determine that an interfering beam is the second beam, and further can reduce interference to the target terminal by adjusting only the second beam, without adjusting all beams and statically configuring that edge-users in adjacent cells use inter-frequency resources. Therefore, inter-device interference coordination can be implemented in high-frequency cells.

Optionally, the transmission coordination module may specifically adjust the second beam by using one or more of the following methods: reducing a power of the second beam according to the coordination message; disabling the second beam according to the coordination message; or when the coordination message further includes information about a resource used on a first beam, reducing, by the second device on the second beam according to the coordination message, use of the resource used on the first beam.

A ninth aspect of the present invention provides an inter-device coordination apparatus, applied to a target terminal in a wireless communications system and including: a beam receiving module, configured to receive a first beam sent by a first device; a beam measurement module, configured to measure the first beam, to obtain a first measurement quantity, where the beam receiving module is further configured to receive a second beam sent by a second device, where the second beam carries identifier information of the second beam; and the beam measurement module is further configured to measure the second beam, to obtain a second measurement quantity; and a message sending module, configured to: when the first measurement quantity and the second measurement quantity meet a preset condition, send a notification message to the first device, where the notification message includes the identifier information of the second beam. According to the inter-device coordination apparatus provided in the ninth aspect of the present invention, the first device can learn that an interfering beam is the second beam, and further perform transmission coordination with the second device only for the second beam, without performing interference coordination for all beams and statically configuring that edge-users in adjacent cells use inter-frequency resources. Therefore, inter-device interference coordination can be implemented in high-frequency cells.

Optionally, the preset condition may include one or more of the following conditions: The first measurement quantity is less than a first preset value; the second measurement quantity is greater than a second preset value; or a difference between the first measurement quantity and the second measurement quantity is less than a third preset value.

Optionally, the first beam may include any one of the following beams: any one beam in polling beams that are received by the target terminal and are sent by the first device, a beam that has best signal quality in polling beams that are received by the target terminal and are sent by the first device, a specified beam in polling beams that are received by the target terminal and are sent by the first device, or a set of a plurality of polling beams that are received by the target terminal and are sent by the first device, where in this case, the first measurement quantity is an average value of measurement quantities of beams in the first beam.

A tenth aspect of the present invention provides a beam training apparatus, applied to a second device in a wireless communications system and including: a message receiving module, configured to receive a request message sent by a target terminal, where the request message is used to indicate that the target terminal requests to perform beam training with the second device; and a beam training module, configured to: after the request message is received, perform beam training with the target terminal. The beam training apparatus provided in the tenth aspect of the present invention can determine an interfering beam by means of beam training with the second device, to help a first device and the second device perform transmission coordination only for the interfering beam.

The beam training apparatus can determine the interfering beam by means of beam training with the second device, to help the first device and the second device perform transmission coordination only for the interfering beam.

Optionally, the beam training apparatus provided in the tenth aspect of the present invention further includes: an interference determining module, configured to determine, according to a result of the beam training with the target terminal, identifier information of the interfering beam that causes interference to the target terminal.

Optionally, the interference determining module may determine the identifier information of the interfering beam by using one or more of the following method: determining a transmit angle for transmitting the interfering beam; determining a transmit matrix for transmitting the interfering beam; or determining identifier information of the target terminal that receives the interfering beam. Alternatively, the interference determining module may directly receive the identifier information of the interfering beam from the target terminal, and specifically, the interference determining module may receive a first advertisement message from the target terminal, where the first advertisement message includes the identifier information of the interfering beam.

Optionally, the beam training apparatus provided in the tenth aspect of the present invention further includes: a transmission coordination module, configured to adjust the interfering beam according to the determined identifier information of the interfering beam, to perform transmission coordination with the first device.

Optionally, the transmission coordination module may specifically adjust the interfering beam by using one or more of the following methods: reducing a power of the interfering beam; disabling the interfering beam; or when the first device communicates with the target terminal by using a serving beam, determining, by the transmission coordination module from the first device, information about a resource used on the serving beam, and reducing, on the interfering beam, use of the resource used on the serving beam.

An eleventh aspect of the embodiments of the present invention provides a beam training apparatus, applied to a target terminal in a wireless communications system and including: a message sending module, configured to send a request message to a second device, where the request message is used to request to perform beam training with the second device; and a beam training module, configured to: after the request message is sent, perform beam training with the second device.

Optionally, a first device communicates with the target terminal by using a serving beam, and the beam training apparatus provided in the eleventh aspect of the embodiments of the present invention further includes: a beam measurement module, configured to: measure the serving beam, to obtain a service measurement quantity; and if the service measurement quantity is less than a first preset value, trigger the message sending module to perform the step of sending a request message to the second device; or a beam measurement module, configured to: measure a received beam sent by the second device, to obtain an interference measurement quantity; and if the interference measurement quantity is greater than a second preset value, trigger the message sending module to perform the step of sending a request message to the second device; or a beam measurement module, configured to measure the serving beam, to obtain a service measurement quantity, where the beam measurement module is further configured to: measure a received beam sent by the second device, to obtain an interference measurement quantity; and if a difference between the service measurement quantity and the interference measurement quantity is less than a third preset value, trigger the message sending module to perform the step of sending a request message to the second device; or the apparatus further includes a message receiving module, configured to: when receiving an indication message sent by the first device, trigger the message sending module to perform the step of sending a request message to the second device, where the indication message is used to instruct the target terminal to perform beam training with the second device.

Optionally, the beam training apparatus provided in the eleventh aspect of the present invention further includes: an interference determining module, configured to determine, according to a result of the beam training with the second device, identifier information of an interfering beam that causes interference to the target terminal.

Optionally, the interference determining module is specifically configured to determine the identifier information of the interfering beam by using one or more of the following methods: determining a receiving angle at which the target terminal receives the interfering beam; determining a precoding matrix indicator PMI of the interfering beam; determining identifier information of the target terminal; or receiving the identifier information of the interfering beam from the second device.

Optionally, the message sending module is further configured to: send a first advertisement message to the second device, where the first advertisement message includes identifier information of the first device and the identifier information that is of the interfering beam and that is determined by the target terminal; or send a second advertisement message to the first device, where the second advertisement message includes identifier information of the second device and the identifier information that is of the interfering beam and that is determined by the target terminal.

A twelfth aspect of the present invention provides a related device, including the inter-device coordination apparatus provided in the seventh aspect of the present invention.

A thirteenth aspect of the present invention provides a related device, including the inter-device coordination apparatus provided in the eighth aspect of the present invention.

A fourteenth aspect of the present invention provides a related terminal, including the inter-device coordination apparatus provided in the ninth aspect of the present invention.

A fifteenth aspect of the present invention provides a related device, including the beam training apparatus provided in the tenth aspect of the present invention.

A sixteenth aspect of the present invention provides a related terminal, including the beam training apparatus provided in the eleventh aspect of the present invention.

A seventeenth aspect of the present invention provides a wireless communications system, including the device or terminal in any one of the twelfth aspect to the sixteenth aspect of the present invention.

According to the inter-device coordination method provided in the embodiments of the present invention, the first device sends the first beam to the target terminal, and receives the notification message sent by the target terminal, where the notification message is used to indicate that the first beam is interfered with by the second beam sent by the second device, and the notification message includes the identifier information of the second beam; and the first device performs transmission coordination with the second device according to the notification message, to reduce the interference from the second beam to the first beam. After the method is implemented, the first device can determine the interfering beam, and further can coordinate with the second device, to reduce the interference caused by the interfering beam. In addition, in the method provided in the embodiments of the present invention, the interference is reduced by means of inter-device coordination, without statically configuring that edge-users in adjacent cells use inter-frequency resources. Therefore, inter-device interference coordination can be implemented in high-frequency cells.

BRIEF DESCRIPTION OF DRAWINGS

FIG. 4 (*b*) is a flowchart of another embodiment of a beam training method according to an embodiment of the present invention;

DESCRIPTION OF EMBODIMENTS

Embodiments of the present invention provide an inter-device coordination method, to coordinate interference between high-frequency cells. The embodiments of the present invention further provide a related beam training method, and a related apparatus, device, terminal, and system. Descriptions are separately provided in the following.

The method, the apparatus, and the system provided in the embodiments of the present invention are mainly applicable to a wireless communications system. The wireless communications system may specifically include a Long Term Evolution (LTE, Long Term Evolution) system (including 2G, 3G, and 4G systems, and a subsequent 5G system), a Wireless Fidelity (WiFi) system, a Worldwide Interoperability for Microwave Access (WI MAX,) system, or another system.

The device (including a first device and a second device) used in the embodiments of the present invention may specifically include a base transceiver station (BTS) in the 2G system, a NodeB (NodeB) in the 3G system, an evolved NodeB (eNB, evolved NodeB) in the 4G system, a base station in the subsequent 5G system, a home evolved NodeB (HeNB), a relay node (Relay), a femto (Femto) base station, a pico (Pico) base station, a WiFi access point (AP), or another device.

The terminal used in the embodiments of the present invention may specifically include a user terminal (UE) such as a mobile phone, a tablet, a personal computer PC, and a mobile PC, and further includes a customer-premises equipment (CPE), a WiFi station (STA), or another terminal.

Figure 1:
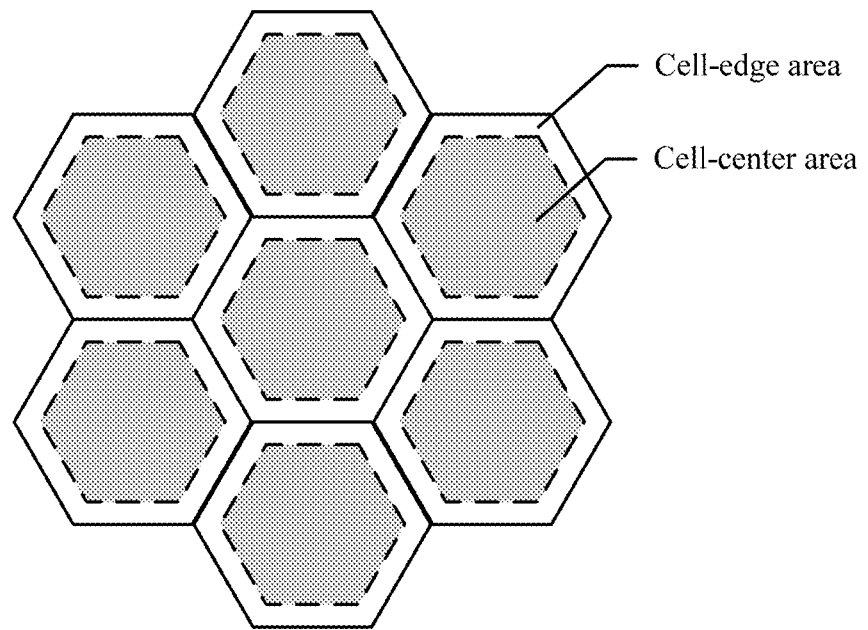
FIG. 1 is a schematic diagram of an ICIC technology.

In the prior art, an ICIC technology is usually used to resolve inter-cell interference. The ICIC technology mainly includes two coordination manners: fractional frequency reuse (FFR, Frequency Reuse) and soft frequency reuse (SFR, Soft Frequency Reuse). For basic principles of the ICIC technology, refer to FIG. 1. In an FFR technology, a user in a cell-center area may use all frequency bands, but a user in a cell-edge uses only partial frequency bands, and edge users in different cells use different frequency bands, so that the edge users in the different cells are not interfered with by a signal in a neighboring cell. In an SFR technology, a cell-edge user may use all frequency bands, but powers on some of the used frequency bands need to be reduced, to reduce interference to a neighboring cell. It can be learned that, the ICIC technology is a method for statically allocating a specific resource to a user in a cell-edge area, to implement interference coordination.

A conventional operating frequency band in conventional mobile communication is mainly a frequency band lower than 3 GHz, and spectrum resources are extremely crowded. With development of science and technology, a demand for mining high-frequency band resources becomes increasingly obvious. In the embodiments of the present invention, a cell that uses a high-frequency band resource is referred to as a "high-frequency cell". Because a wavelength of a high-frequency signal is relatively short, a size of an antenna for the high-frequency signal is also relatively small, and it is suitable to perform BF for the high-frequency cell by using a large-scale antenna array. A BF technology is a technology that performs weighted processing on each physical antenna based on an adaptive antenna principle and by using an antenna array and an advanced signal processing algorithm. From a perspective of a receive end, the entire antenna array is equivalent to one virtual antenna. After weighted processing is performed, a high-frequency antenna array can form a slender beam that aims at a target terminal, and then communication is performed with the target terminal by using the slender beam. Because the beam is relatively narrow, the beam has a relatively small coverage angle, and in a communication process, a direction of the beam needs to be adjusted by continuously tracing a location of the target terminal, to always maintain relatively good communication quality with the target terminal. It may be understood that, if the target terminal moves from a cell-center area to a cell-edge location, a beam transmitted by using the BF technology also needs to trace the target terminal to the cell-edge location. In this dynamic beam coverage manner, a specific resource cannot be allocated to a user in a cell-edge area of a high-frequency cell, and therefore the ICIC technology used in a relatively fixed static coverage manner of a cell is not suitable for implementing interference coordination.

To resolve a problem of interference coordination between high-frequency cells, an embodiment of the present invention provides a related inter-device coordination method. It should be noted that the method provided in this embodiment of the present invention can be used to coordinate interference between high-frequency cells, and also is applicable to low-frequency cells such as 2G, 3G, and 4G systems.

Figure 2:
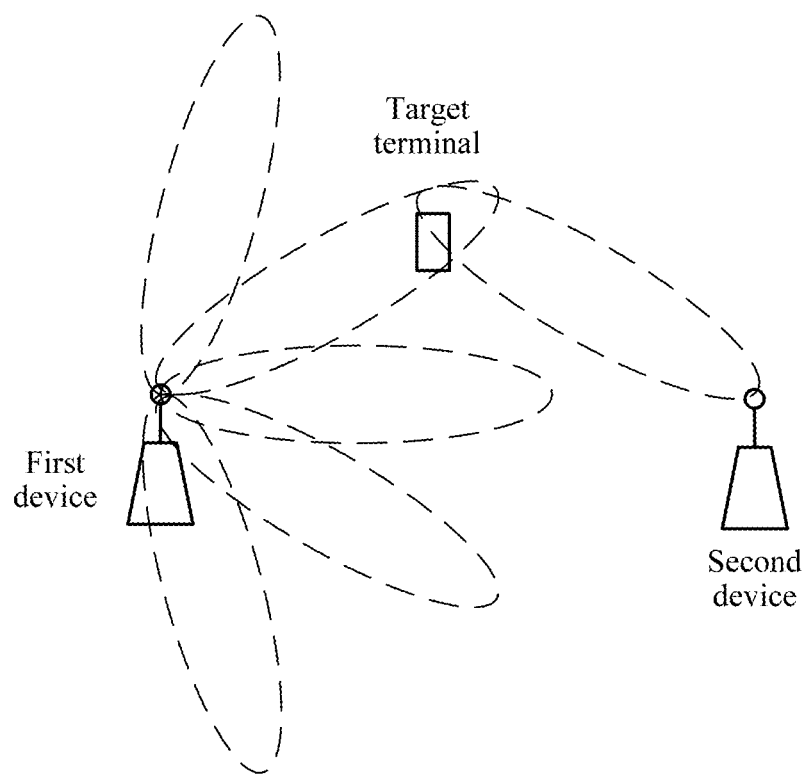
FIG. 2 is a schematic diagram of a basic structure of a wireless communications system according to the present invention.

The inter-device coordination method provided in this embodiment of the present invention is applicable to a scenario in which a device in a wireless communications system performs beam polling or another scenario. Referring to FIG. 2, the wireless communications system includes at least a target terminal, a first device that provides a service for the target terminal, and a second device that causes interference to the first device. Generally, the first device and the second device are located in adjacent cells, or may not be located in adjacent cells. This is not limited herein. The first device and the second device may exchange data by using a high-speed interface (for example, an interface between base stations). Based on the system shown in FIG. 2, referring to FIG. 3, a basic procedure of the inter-device coordination method provided in this embodiment of the present invention includes the following steps.

301. The first device sends a first beam to the target terminal.

The first device sends the first beam to the target terminal, and the target terminal receives the first beam. This embodiment may be applied to a scenario in which the first device communicates with the target terminal, and in this case, the first beam may be a slender beam obtained by means of beamforming.

In addition, as mentioned above, in a high-frequency cell, a slender beam is used to communicate with a user. Because the slender beam has a relatively small coverage angle, before establishing a connection to the target terminal, the first device needs to determine a location of the target terminal first. Generally, the first device determines the location of the target terminal by means of beam polling (which is also referred to as beam scanning). Specifically, due to a limitation from a radio frequency design, the first device cannot simultaneously transmit a plurality of beams in a plurality of directions. In this case, when the first device does not learn of the location of the target terminal, the first device successively sends a polling beam in each direction of an area that needs to be covered, to find an approximate location of the target terminal. The method is beam polling. Different from the slender beam that is specially used to communicate with a specific user, the polling beam is a broadcast beam that has a relatively large coverage angle, so that the location of the target terminal can be found by using a relatively small quantity of polling beams. This embodiment may be further used in a beam polling scenario in which the first beam may be a polling beam received by the target terminal.

This embodiment may be further applied to another scenario in which the first beam may be another type of beam. This is not limited herein.

302. The second device sends a second beam to the target terminal.

The second device sends a beam in each direction of space, and sends the second beam in a direction of the target terminal. The target terminal receives the second beam. Similar to step 301, the second beam may also be a slender beam, a polling beam, or another type of beam. Because the second device does not serve the target terminal, the second beam sent by the second device is an interfering signal for the target terminal.

Generally, a device adds identifier information of the device to a beam sent by the device. Particularly, the second device sends a beam in each direction that needs to be covered. Therefore, to distinguish between these beams, the second device in this embodiment sets identifier information for these beams, and each piece of identifier information is used to uniquely identify one beam. The identifier information may be an identifier, a characteristic sequence, or another form, and the second device adds the identifier information to a corresponding beam. Therefore, the second beam received by the target terminal carries identifier information of the second beam.

Alternatively, step 302 may be performed before step 301, and this is not limited in this embodiment.

303. The target terminal measures the received first beam and second beam.

The target terminal measures the received first beam, to obtain a first measurement quantity. The target terminal further measures the received second beam, to obtain a second measurement quantity.

A measurement quantity of a beam may be a parameter in many forms, and may specifically include one or more of the following parameters: a reference signal received power (RSRP) of the beam, reference signal received quality (RSRQ), or a signal-to-noise ratio of the beam, or may be calculated according to some parameters thereof, or may be another parameter. In this embodiment, a larger measurement quantity indicates a better signal quality of a beam.

304. If a first measurement quantity and a second measurement quantity meet a preset condition, the target terminal sends a notification message to the first device.

If the first measurement quantity and the second measurement quantity meet the preset condition, it indicates that the second beam causes interference to the first beam. The target terminal sends the notification message to the first device, and the first device receives the notification message. The notification message includes the identifier information of the second beam.

The preset condition may include many preset conditions. For example, if the first measurement quantity and the second measurement quantity meet one or more of the following conditions: the first measurement quantity is less than a first preset value, the second measurement quantity is greater than a second preset value, or a difference between the first measurement quantity and the second measurement quantity is less than a third preset value, the target terminal determines that the first measurement quantity and the second measurement quantity meet the preset condition. The difference between the first measurement quantity and the second measurement quantity is obtained by subtracting the second measurement quantity from the first measurement quantity, and the first preset value, the second preset value, and the third preset value may be positive numbers, negative numbers, or 0.

305. The first device performs transmission coordination with the second device.

After receiving the notification message, the first device performs transmission coordination with the second device, to reduce the interference from the second beam to the first beam. Specifically, after receiving the notification message, the first device sends a coordination message to the second device by using an interface between the first device and the second device, to perform transmission coordination. The coordination message may include the identifier information of the second beam.

After receiving the coordination message, the second device may learn that the second beam causes interference to the beam sent by the first device. In this case, the second device adjusts the second beam, to reduce the interference from the second beam to the first beam.

There are many methods in which the second device adjusts the second beam. For example, the second device may reduce a power of the second beam, or directly disable the second beam. In this way, the interference from the second beam to the first beam is greatly reduced. A quantity by which the second device reduces the power of the second beam may be determined by means of negotiation with the first device, or may be determined by the second device. This is not limited herein. In addition, the coordination message may further include information about a resource used on the first beam (including a time-frequency resource and/or a code resource). Specifically, a frequency domain resource used on the first beam may be represented by a physical resource block (Physical Resource Block) or other information, and a time domain resource used on the first beam may be represented by an almost blank subframe (ABS, Almost Blank Subframe), preset TDD uplink-downlink configuration (TDD UL-DL Configuration) information, or other information. After receiving the coordination message, the second device may reduce, on the second beam, use of the resource used on the first beam. This step may be specifically implemented in a manner such as reducing a power of the time-frequency resource used on the first beam, partially reducing use of the time-frequency resource and/or the code resource used on the first beam, or not using the time-frequency resource and/or the code resource used on the first beam. In this way, the power of the second beam does not need to be greatly reduced while the interference from the second beam to the first beam is reduced, so that the second beam can still normally serve another terminal. A quantity by which the second device reduces the power of the time-frequency resource used on the first beam may be determined by means of negotiation with the first device, or may be determined by the second device. This is not limited herein. Alternatively, the second device may adjust the second beam by using another method, and this is not limited herein.

It should be noted that, in the prior art, transmission coordination is also performed between the first device and the second device. For example, in the prior art, if the first device determines that the second device affects the first beam, the first device notifies the second device of the time-frequency resource used by the first device. In this case, on a corresponding time-frequency resource in a cell-edge area, the second device stops sending data or sends data by reducing a power. However, different resources are no longer configured for a cell-edge area and a cell-center area in a high-frequency cell. Therefore, in this method, the second device needs to restrict use of the resource on all beams. This undoubtedly reduces spectrum utilization efficiency of a system greatly. However, in this embodiment, use of a corresponding resource is restricted only on the second beam that causes interference to the first beam. In this way, the system can maintain relatively high spectrum utilization efficiency.

In the method provided in this embodiment, the first device can determine an interfering beam, and further can coordinate with the second device, to reduce interference caused by the interfering beam. In addition, in the method provided in this embodiment of the present invention, the interference is reduced by means of coordination among the first device, the target terminal, and the second device, without statically configuring that edge-users in adjacent cells use inter-frequency resources. Therefore, inter-device interference coordination can be implemented in high-frequency cells.

Steps 303 and 304 are optional steps. After receiving the first beam and the second beam, the target terminal may also determine, by using another method, that the second beam causes interference to the first beam, and then sends, to the first device, a notification message that carries the identifier information of the second beam and identifier information of the second device.

Particularly, in step 304, the target terminal may also send the notification message to the second device, and the notification message includes the identifier information of the second beam. In this case, in step 305, a method in which the first device performs transmission coordination with the second device may specifically include the following steps: The second device directly reduces the power of the second beam or disables the second beam; or the second device determines, from the first device by using an interface between devices, the resource used on the first beam, and then the second device does not use, for the second beam, the resource used on the first beam, or reduces, on the second beam, the power of the resource used on the first beam.

Particularly, in a running process of a wireless communications system, the target terminal may receive, a plurality of times at different moments, beams sent by the first device. In this case, the target terminal may use, as the first beam, any one beam in the received beams sent by the first device; or use, as the first beam, a beam that has best signal quality in the received beams sent by the first device; or use, as the first beam, a specified beam in the received beams sent by the first device. More particularly, the target terminal may use, as the first beam, a set of the plurality of received beams sent by the first device. That the target terminal measures the first beam means measuring each beam in the first beam, where an obtained measurement quantity is an average value (which may be an arithmetic average value or a weighted average value) of measurement quantities of all the beams in the first beam, or averaging measurement results of a beam for the corresponding beam, that is, each beam has a measurement quantity.

Similar to the foregoing paragraph, the target terminal may use, as the second beam, any one beam in received beams sent by the second device; or use, as the second beam, a beam that has best signal quality in received beams sent by the second device; or use, as the second beam, a specified beam in received beams sent by the second device. More particularly, the target terminal may use, as the second beam, a set of a plurality of received beams sent by the second device. In this case, that the target terminal measures the second beam means measuring each beam in the second beam, where an obtained measurement quantity is an average value (which may be an arithmetic average value or a weighted average value) of measurement quantities of all the beams in the second beam.

Particularly, in some embodiments of the present invention, a smaller measurement quantity of a beam may indicate a better beam. In this case, the preset condition in step 304 is changed to: the first measurement quantity is greater than the first preset value, the second measurement quantity is less than the second preset value, or the difference between the first measurement quantity and the second measurement quantity is greater than the third preset value. If the first measurement quantity and the second measurement quantity meet any one of the foregoing conditions, the target terminal determines that the first measurement quantity and the second measurement quantity meet the preset condition.

In this embodiment, the first device provides a service for the target terminal, and a beam transmitted by the second device is an interfering signal for the target terminal. It may be understood that the second device also serves a terminal in a cell in which the second device is located, and a beam transmitted by the first device is also an interfering signal for the terminal in the cell in which the second device is located. Therefore, in step 301, the first device may also set identifier information for each beam that is transmitted by the first device, and add the identifier information to a corresponding beam, so that the terminal in the cell in which the second device is located determines a beam that causes interference to the terminal.

Figure 3:
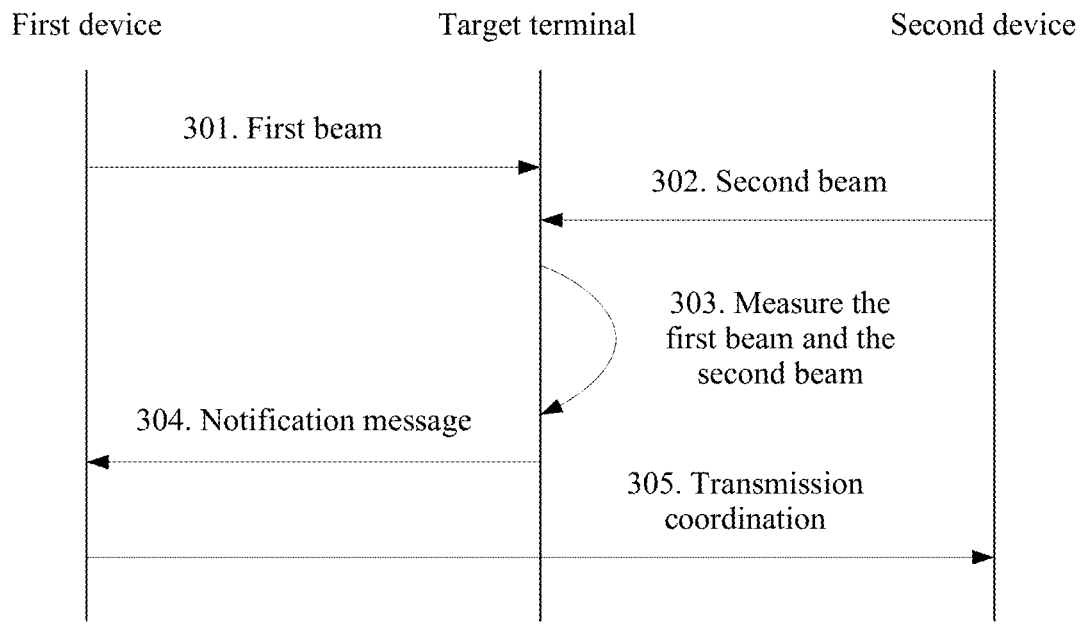
FIG. 3 is a flowchart of an embodiment of an inter-device coordination method according to an embodiment of the present invention.

In the embodiment shown in FIG. 3, the second device configures identifier information for a transmitted beam, and the second device adds the identifier information of the second beam to the second beam, so that the terminal can determine the interfering beam. This method can be well applied in a scenario in which a relatively small quantity of beams exist, such as a beam polling scenario. However, when communicating with a terminal, a device uses a slender beam with an extremely small coverage angle, and the device sends a huge quantity of such beams. Therefore, allocating identifier information to each slender beam consumes a huge quantity of resources.

Generally, after determining the location of the target terminal by using a method such as beam polling, the first device performs beam training with the target terminal, and further determines a serving beam used to communicate with the target terminal. Different from the polling beam, the serving beam is not a broadcast beam, but a beam specially used by the first device to communicate with the target terminal. The serving beam may be obtained after an antenna array is processed by using a beamforming technology. The serving beam is relatively slender, and has a long coverage distance but a relatively small coverage angle.

Therefore, the serving beam is also referred to as a pencil beam. It may be understood that, when communicating with the target terminal by using the serving beam, the first device may be still interfered with by a signal of an interfering cell. For such a scenario, an embodiment of the present invention provides another inter-device coordination method, and a basic procedure includes the following steps.

401. A target terminal sends a request message to a second device.

The target terminal sends the request message to the second device, and the request message is used to request to perform beam training with the second device. The second device receives the request message.

402. The second device performs beam training with the target terminal.

After receiving the request message, the second device determines whether to perform beam training with the target terminal. If a determining result is that the second device performs beam training with the target terminal, the second device performs beam training with the target terminal.

A process in which the target terminal performs beam training with the second device is similar to a method in which the target terminal performs beam training with a first device. For example, the second device may send a plurality of beams in a range at a relatively large angle, and then determine, according to response information of the target terminal, a relatively small direction range in which the target terminal is located, and then re-send a plurality of beams in the direction range, to further determine a direction range of the target terminal. After a plurality of times of determining, the second device can relatively precisely determine a direction of the target terminal.

It should be noted that, because a channel connection does not always exist between the second device and the target terminal in a communication process, in the prior art, the target terminal does not perform beam training with the second device.

A result of the beam training performed by the second device with the target terminal is used to determine the direction of the target terminal and further determine an interfering beam sent by the second device in the direction. An operation of determining the interfering beam may be performed by the second device, or may be performed by the target terminal. Descriptions are separately provided in the following.

Figure 4:
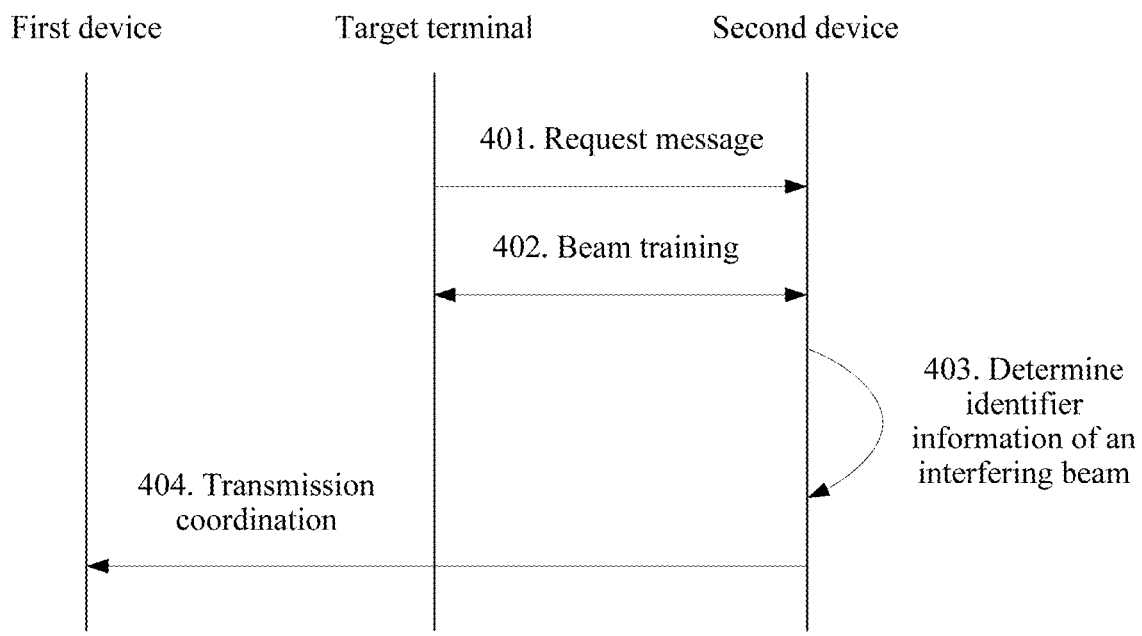
FIG. 4 (*a*) is a flowchart of an embodiment of a beam training method according to an embodiment of the present invention.
Figure 4:
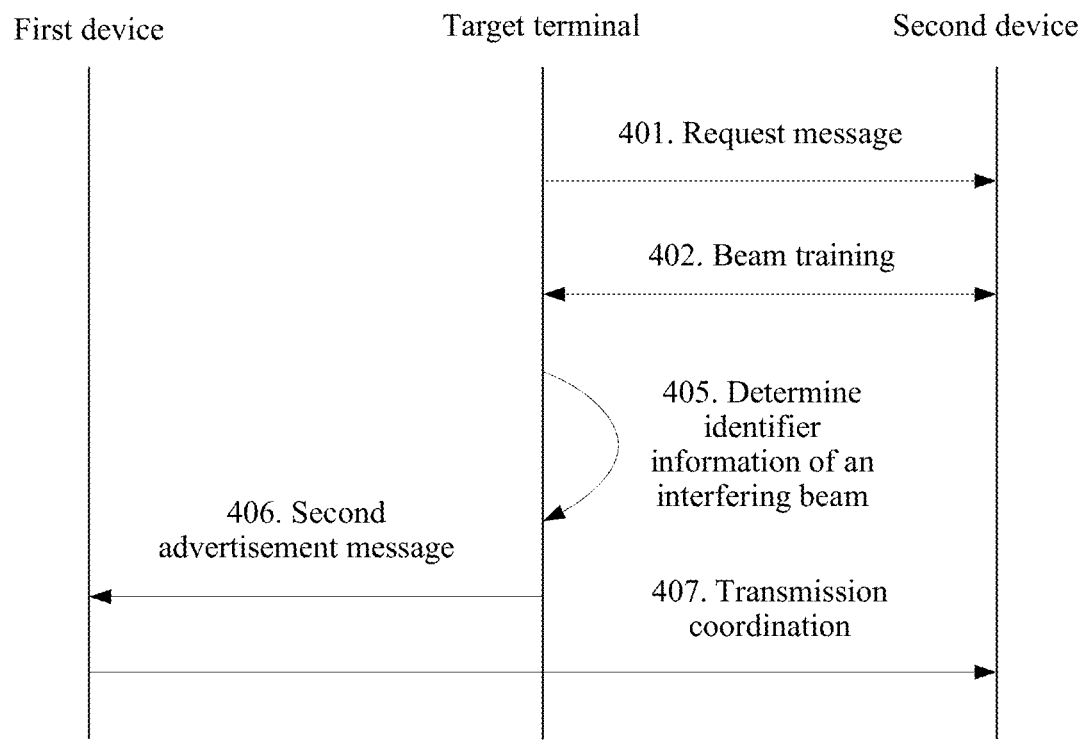

Referring to FIG. 4 (*a*), FIG. 4 (*a*) describes a scenario in which the operation of determining the interfering beam is performed by the second device, and a specific procedure includes the following steps.

403. The second device determines identifier information of an interfering beam.

After performing beam training with the target terminal, the second device can relatively precisely determine the direction of the target terminal. In this case, a beam sent by the second device in the direction is the interfering beam.

In this embodiment, the second device may further determine the identifier information of the interfering beam. Specifically, the second device may determine one or more of a transmit angle for transmitting the interfering beam, a transmit matrix for transmitting the interfering beam, or identifier information of the target terminal that receives the interfering beam, or may determine information in another form. This is not limited herein.

Particularly, in this step, the identifier information of the interfering beam may be alternatively determined by the target terminal, and then the second device obtains the identifier information from the target terminal. The identifier information, of the interfering beam, determined by the target terminal may specifically include one or more of a receiving angle at which the target terminal receives the interfering beam, a precoding matrix indicator (PMI, precoding Matrix Indicator) of the interfering beam, or identifier information of the target terminal, or may be information in another form. This is not limited herein.

404. The second device performs transmission coordination with a first device.

After determining the identifier information of the interfering beam, the second device adjusts the interfering beam according to the identifier information of the interfering beam, to perform transmission coordination with the first device to reduce interference from the interfering beam to the target terminal.

To reduce the interference from the interfering beam to the target terminal, the second device may directly reduce a power of the interfering beam or disable the interfering beam. In addition, the second device may further send a coordination message to the first device, and the coordination message includes the identifier information, of the interfering beam, determined by the second device in step 403. In this way, after receiving the coordination message sent by the second device, the first device can learn of the interfering beam that causes interference to the target terminal, and further can perform coordination with the second device, to reduce the interference from the interfering beam to the target terminal. For example, the second device may reduce the power of the interfering beam, and a quantity by which the second device reduces the power is determined after the second device negotiates with the first device. The first device may further determine information about a resource (including a time-frequency resource and/or a code resource) used on a serving beam, and notify the second device of the information. After determining, from the first device, the resource used on the serving beam, the second device may reduce, on the interfering beam, use of the resource used on the serving beam, such as reducing, on the interfering beam, a power of the time-frequency resource used on the serving beam, partially reducing use of the time-frequency resource and/or the code resource used on the serving beam, or not using the time-frequency resource and/or the code resource used on the serving beam. In this way, the power of the interfering beam does not need to be greatly reduced while the interference from the interfering beam to the serving beam is reduced, so that the interfering beam can still normally serve a terminal in a cell in which the second device is located.

FIG. 4 (a) describes the scenario in which the operation of determining the interfering beam is performed by the second device. The following describes, with reference to FIG. 4 (b), a scenario in which the target terminal determines the interfering beam, and a specific procedure of the scenario includes the following steps.

405. The target terminal determines identifier information of an interfering beam.

After performing beam training with the target terminal, the second device can relatively precisely determine the direction of the target terminal. In this case, a beam sent by the second device in the direction is the interfering beam.

In this embodiment, the target terminal determines the identifier information of the interfering beam. Specifically, the target terminal may determine one or more of a receiving angle at which the interfering beam is received, a PMI of the interfering beam, or identifier information of the target terminal, or may determine information in another form. This is not limited herein.

Particularly, in this step, the identifier information of the interfering beam may be alternatively determined by the second device, and then the target terminal obtains the identifier information from the second device. The identifier information, of the interfering beam, determined by the second device may include one or more of a transmit angle for transmitting the interfering beam, a transmit matrix for transmitting the interfering beam, or identifier information of the target terminal that receives the interfering beam, or may be information in another form. This is not limited herein.

406. The target terminal instructs one of a first device and the second device to perform transmission coordination with the other device.

After determining the identifier information of the interfering beam, the target terminal instructs one of the first device and the second device to perform transmission coordination with the other device, to reduce interference from the interfering beam to the target terminal.

Specifically, the target terminal may send a first advertisement message (not shown in the figure) to the second device, and the first advertisement message includes identifier information of the first device and the identifier information, of the interfering beam, determined by the target terminal in step 405. In this way, after receiving the first advertisement message, the second device can perform transmission coordination with the first device, to reduce the interference from the interfering beam to the target terminal.

The target terminal may alternatively send a second advertisement message (not shown in the figure) to the first device, and the second advertisement message includes identifier information of the second device and the identifier information, of the interfering beam, determined by the target terminal in step 405. In this way, after receiving the second advertisement message, the first device can perform transmission coordination with the second device, to reduce the interference from the interfering beam to the target terminal. Only an example in which the target terminal may send the second advertisement message to the first device is used in FIG. 4 (b) for description.

407. The first device performs transmission coordination with the second device.

After receiving the second advertisement message sent by the target terminal, the first device performs transmission coordination with the second device according to the second advertisement message, to reduce the interference from the interfering beam to the target terminal.

Specifically, the first device may send a coordination message to the second device, and the coordination message includes the identifier information of the interfering beam. After receiving the coordination message, the second device may directly disable the interfering beam or reduce a power of the interfering beam, and a quantity by which the second device reduces the power is determined after the second device negotiates with the first device. The coordination message may further include a resource used on a serving beam (including a time-frequency resource and/or a code resource), so that the second device can reduce, on the interfering beam, use of the resource used on the serving beam, such as reducing, on the interfering beam, a power of the time-frequency resource used on the serving beam, partially reducing use of the time-frequency resource and/or the code resource used on the serving beam, or not using the time-frequency resource and/or the code resource used on the serving beam. In this way, the power of the interfering beam does not need to be greatly reduced while the interference from the interfering beam to the serving beam is reduced, so that the interfering beam can still normally serve another terminal.

If the target terminal sends the first advertisement message to the second device in step 406, the second device performs transmission coordination with the first device in step 407. A method in step 407 is basically the same as that in step 404, and details are not described herein again.

For step 406 and step 407, refer to related content that is in step 304 and step 305 in the embodiment shown in FIG. 3 and that is about sending, by the target terminal, the notification message to the first device, and performing, by the first device, transmission coordination with the second device.

The embodiments shown in FIG. 4 (*a*) and FIG. 4 (*b*) are applicable to a scenario in which a device normally communicates with a terminal, where the target terminal performs beam training with the second device, to determine the identifier information of the interfering beam, so that the first device and the second device can reduce, by means of transmission coordination, the interference caused by the interfering beam. In addition, in the method provided in this embodiment of the present invention, the interference is reduced by means of coordination among the first device, the target terminal, and the second device, without statically configuring that edge-users in adjacent cells use inter-frequency resources. Therefore, inter-device interference coordination can be implemented in high-frequency cells.

It should be noted that, in the prior art, transmission coordination is also performed between the first device and the second device. For example, in the prior art, if the first device determines that the interfering beam affects the serving beam, the first device notifies the second device of the time-frequency resource used on the serving beam. In this case, on a corresponding time-frequency resource in a cell-edge area, the second device stops sending data or sends data by reducing a power. However, different resources are no longer configured for a cell-edge area and a cell-center area in a high-frequency cell. Therefore, in this method, the second device needs to restrict use of the resource on all beams. This undoubtedly reduces spectrum utilization efficiency of a system greatly. However, in this embodiment, use of a corresponding resource is restricted only on the interfering beam. In this way, the system can maintain relatively high spectrum utilization efficiency.

It may be understood that the target terminal needs to request to perform beam training with the second device only when a beam sent by the second device causes interference to the target terminal. Therefore, the target terminal may first determine whether the beam sent by the second device causes interference to the target terminal. If a determining result is that the beam causes interference to the target terminal, an operation in step 401 is triggered. For example, there are many specific determining methods:

Method 1: The target terminal measures the serving beam, to obtain a service measurement quantity, and if the target terminal determines that the service measurement quantity is less than a first preset value, it indicates that the serving beam has poor signal quality and is easy to be interfered with, and the operation in step 401 is triggered.

Method 2: The target terminal measures a received beam sent by the second device, to obtain an interference measurement quantity, and if the target terminal determines that the interference measurement quantity is greater than a second preset value, it indicates that the beam sent by the interfering terminal causes excessively large interference, and the operation in step 401 is triggered.

Method 3: The target terminal measures the serving beam, to obtain a service measurement quantity, and measures a received beam sent by the second device, to obtain an interference measurement quantity, and if a difference between the service measurement quantity and the interference measurement quantity is less than a third preset value, it indicates that the beam sent by the second device causes relatively large interference to the serving beam, and the operation in step 401 is triggered.

Method 4: The first device determines whether the target terminal performs beam training with the second device; if the first device determines that the beam sent by the second device causes interference to the serving beam, the first device sends an indication message to the target terminal, where the indication message is used to instruct the target terminal to perform beam training with the second device; and after the target terminal receives the indication message, the operation in step 401 is triggered.

Values of the first preset value, the second preset value, and the third preset value may be positive numbers, negative numbers, or 0, and this is not limited in this embodiment of the present invention. Alternatively, the operation in step 401 may be triggered by using another method, and this is not limited in this embodiment of the present invention.

The service measurement quantity is used to represent a measurement quantity of the serving beam, and the interference measurement quantity is used to represent a measurement quantity of the beam sent by the second device. A measurement quantity of a beam may be a parameter in many forms, including an RSRP, RSRQ, or a signal-to-noise ratio of the beam, or another parameter. In this embodiment, a larger measurement quantity indicates better signal quality of a beam. In an actual application scenario, if a smaller measurement quantity indicates better signal quality of a beam, the method 1 may be adaptively changed into the following step: If the target terminal determines that the service measurement quantity is greater than the first preset value, the operation in step 401 is triggered; the method 2 may be adaptively changed into the following step: If the target terminal determines that the interference measurement quantity is less than the second preset value, the operation in step 401 is triggered; the method 3 may be adaptively changed into the following step: If the difference between the interference measurement quantity and the service measurement quantity is less than the third preset value, the operation in step 401 is triggered.

To facilitate understanding of the foregoing embodiments, the following uses one specific application scenario of the foregoing embodiments as an example for description.

In a wireless communications system, there are two adjacent cells: a cell A and a cell B, and a base station A serves UE in the cell A and a base station B serves UE in the cell B.

When the wireless communications system is started, the base station A successively sends polling beams in six directions by using the base station A as a center, and a beam 1A, a beam 2A, a beam 3A, a beam 4A, a beam 5A, and a beam 6A are used herein to represent the six polling beams. An included angle between each two polling beams is 60°, and each polling beam carries identifier information of the beam. Likewise, the base station B also successively sends polling beams in six directions by using the base station B as a center, and a beam 1B, a beam 2B, a beam 3B, a beam 4B, a beam 5B, and a beam 6B are used herein to represent the six polling beams. An included angle between each two polling beams is 60°, and each polling beam carries identifier information of the beam.

Target UE in the cell A is located in coverage of the beam 2A and coverage of the beam 5B, and therefore receives the beam 2A sent by the base station A and the beam 5B sent by the base station B. In this case, the target terminal separately measures RSRQ of the beam 2A and RSRQ of the beam 5B, compares measurement results, and learns that a difference between the RSRQ of the beam 2A and the RSRQ of the beam 5B is less than a first threshold, so that the target UE determines that the beam 5B causes relatively large interference to the beam 2A. In this case, the target UE sends a first message to the base station A, and the first message includes identifier information of the beam 5B.

After receiving the first message sent by the target UE, the base station A may learn that the beam 5B transmitted by the base station B causes interference to the target UE in the cell A. In this case, the base station A sends a second message to the base station B, and the second message includes a time-frequency resource used on the beam 2A. After receiving the second message, the base station B does not use, on the beam 5B, the time-frequency resource used on the beam 2A. In this way, transmission coordination between the base station A and the base station B is implemented.

After beam polling, the base station A determines an approximate location of the target UE. In this case, the base station A uses a BF technology and a pencil beam A to serve the target UE. In this case, the base station B also uses a pencil beam to serve the UE in the cell B.

When receiving the pencil beam A sent by the base station A, the target UE can further receive a beam sent by the base station B. The beam sent by the base station B does not carry identifier information of the beam, and therefore the target UE cannot determine which beam is received from the base station B.

The target UE measures RSRQ of the received pencil beam A, and measures RSRQ of the received beam sent by the base station B. After comparing measurement results, the target UE learns that a difference between the RSRQ of the pencil beam A and the RSRQ of the beam sent by the base station B is less than a second threshold, so that the target UE determines that the beam sent by the base station B causes relatively large interference to the pencil beam A. In this case, the target UE sends a third message to the base station B, and the third message is used by the target UE to request to perform beam training with the base station B, to determine which beam is received by the target UE from the base station B.

After receiving the third message, the base station B performs beam training with the target UE. The target UE determines, by means of beam training, that the target UE receives a pencil beam B sent by the base station B. In this case, the target UE sends a fourth message to the base station A, and the fourth message includes identifier information of the base station B and identifier information of the pencil beam B. After receiving the fourth message, the base station A may determine that the pencil beam B sent by the base station B causes interference to the target UE. In this case, the base station A sends a fifth message to the base station B, and the fifth message includes a time-frequency resource used on the pencil beam A. After receiving the fifth message, the base station B does not use, on the pencil beam B, the time-frequency resource used on the pencil beam A. In this way, transmission coordination between the base station A and the base station B is implemented.

The inter-device coordination method and the beam training method provided in the present invention are described in the foregoing embodiments. The following describes a related apparatus, to implement the foregoing methods.

An inter-device coordination apparatus provided in the present invention is applicable to a device in a wireless communications system. The wireless communications system includes at least a target terminal, a first device that provides a service for the target terminal, and a second device that causes interference to the first device. Generally, the first device and the second device are located in adjacent cells, or may not be located in adjacent cells. This is not limited herein. The first device and the second device may exchange data by using a high-speed interface (for example, an interface between base stations). The present invention separately provides inter-device coordination apparatuses applicable to the target terminal, the first device, and the second device, and descriptions are separately provided in the following.

Figure 5:
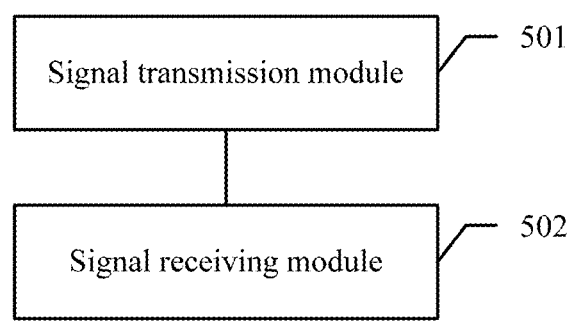
FIG. 5 is a structural diagram of an embodiment of an inter-device coordination apparatus according to an embodiment of the present invention.

Referring to FIG. 5, a basic structure of an inter-device coordination apparatus applicable to a first device according to an embodiment of the present invention includes: a signal transmission module 501 and a signal receiving module 502.

The signal transmission module 501 is configured to send a first beam to a target terminal. The first beam may be a slender beam obtained by means of beamforming, or may be a polling beam received by the target terminal, or may be another type of beam. This is not limited herein.

The signal receiving module 502 is configured to receive a notification message sent by the target terminal. After receiving the first beam sent by the signal transmission module 501, the target terminal further receives a second beam sent by a second device. When determining that the first beam is interfered with by the second beam, the target terminal sends the notification message to the first device. The notification message is used to indicate that the second beam causes interference to the first beam, and the notification message includes identifier information of the second beam. After receiving the notification message, the signal receiving module 502 can determine that the second beam causes interference to the first beam.

The signal transmission module 501 is further configured to send, to the second device according to the notification message received by the signal receiving module 502, a coordination message that is used to request to perform transmission coordination with the second device, to perform transmission coordination with the second device to reduce the interference from the second beam to the first beam. The coordination message includes the identifier information of the second beam. Optionally, the coordination message may further include information about a resource used on the first beam.

It may be understood that the second device also serves a terminal in a cell in which the second device is located, and a beam transmitted by the first device is also an interfering signal for the terminal in the cell in which the second device is located. Therefore, the first beam sent by the signal transmission module 501 may also carry identifier information of the first beam, so that the terminal in the cell in which the second device is located determines a beam that causes interference to the terminal.

Figure 6:
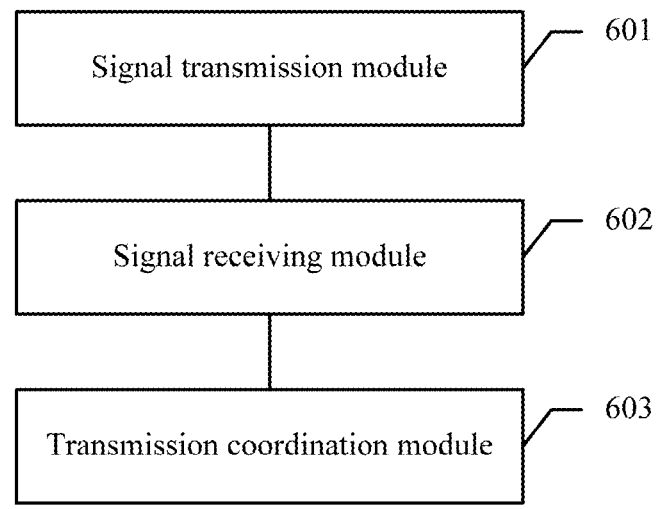
FIG. 6 is a structural diagram of another embodiment of an inter-device coordination apparatus according to an embodiment of the present invention.

Correspondingly, referring to FIG. 6, a basic structure of an inter-device coordination apparatus applicable to a second device according to an embodiment of the present invention includes: a signal transmission module 601, a signal receiving module 602, and a transmission coordination module 603.

The signal transmission module 601 is configured to send a second beam to a target terminal. The second beam may be a slender beam obtained by means of beamforming, or may be a polling beam received by the target terminal, or may be another type of beam. This is not limited herein. The second beam carries identifier information of the second beam. Because the second device does not serve the target terminal, the second beam sent by the signal transmission module 601 is an interfering signal for the target terminal.

The signal receiving module 602 is configured to receive a coordination message from a first device. The first device serves the target terminal by using a first beam, and if determining that the second beam causes interference to the first beam, the first device sends the coordination message to the second device, to indicate that the first device requests to perform transmission coordination with the second device. The coordination message includes the identifier information of the second beam. After receiving the coordination message, the signal receiving module 602 of the second device can determine which beam sent by the second device causes interference to the first beam.

The transmission coordination module 603 is configured to adjust the second beam according to the coordination message, to perform transmission coordination with the first device to reduce the interference from the second beam to the first beam.

Optionally, the signal receiving module 602 may also receive a notification message sent by the target terminal, and the notification message includes the identifier information of the second beam. In this case, the transmission coordination module 603 may perform transmission coordination with the first device in the following manner: directly reducing a power of the second beam or disabling the second beam; or determining, from the first device by using an interface between devices, a resource used on the first beam, and then not using, for the second beam, the resource used on the first beam, or reducing, on the second beam, a power of the resource used on the first beam.

It should be noted that, any device in a wireless communications network may provide, as the first device does, a service for a device in a cell in which the device is located, and cause, as the second device does, interference to a device in a neighboring cell. Therefore, the modules shown in FIG. 5 and FIG. 6 may also be located on a same device in the wireless communications network (for example, the first device may also have the modules of the inter-device coordination apparatus shown in FIG. 6, and the second device may also have the modules of the inter-device coordination apparatus shown in FIG. 5), and the modules shown in FIG. 5 and FIG. 6 may be further split or combined. This is not limited herein.

Figure 7:
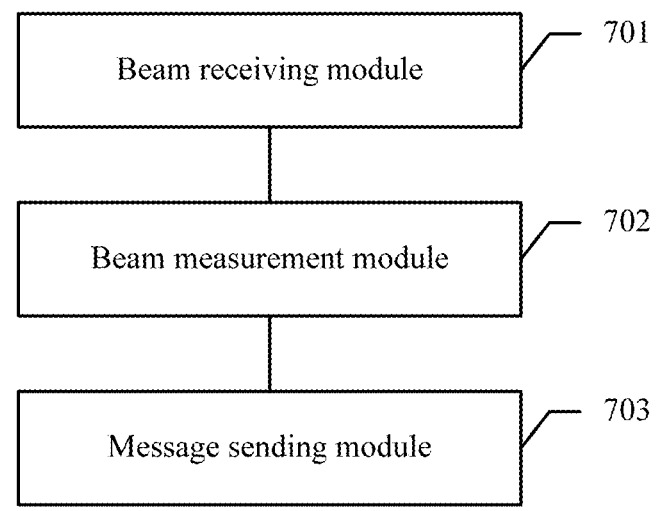
FIG. 7 is a structural diagram of another embodiment of an inter-device coordination apparatus according to an embodiment of the present invention.

Correspondingly, referring to FIG. 7, a basic structure of an inter-device coordination apparatus applicable to a target terminal according to an embodiment of the present invention includes: a beam receiving module 701, a beam measurement module 702, and a message sending module 703.

The beam receiving module 701 is configured to receive a first beam sent by a first device.

The beam measurement module 702 is configured to measure the first beam, to obtain a first measurement quantity. A measurement quantity of a beam may be a parameter in many forms, and may specifically include one or more of an RSRP of the beam, RSRQ of the beam, or a signal-to-noise ratio of the beam, or may be calculated according to some parameters thereof, or may be another parameter. In this embodiment, a larger measurement quantity indicates a better beam.

The beam receiving module 701 is configured to receive a second beam sent by a second device. The second beam carries identifier information of the second beam.

The beam measurement module 702 is further configured to measure the second beam, to obtain a second measurement quantity.

The message sending module 703 is configured to: when the first measurement quantity and the second measurement quantity meet a preset condition, determine that the second beam causes interference to the first beam, and send a notification message to the first device. The notification message includes the identifier information of the second beam. The preset condition may include many preset conditions. For example, if the first measurement quantity and the second measurement quantity meet one or more of the following conditions: the first measurement quantity is less than a first preset value, the second measurement quantity is greater than a second preset value, or a difference between the first measurement quantity and the second measurement quantity is less than a third preset value, the message sending module 703 determines that the first measurement quantity and the second measurement quantity meet the preset condition. The difference between the first measurement quantity and the second measurement quantity is obtained by subtracting the second measurement quantity from the first measurement quantity, and the first preset value, the second preset value, and the third preset value may be positive numbers, negative numbers, or 0.

Optionally, the message sending module 703 may also send the notification message to the second device. The notification message includes the identifier information of the second beam.

Particularly, in a running process of a wireless communications system, the target terminal may receive, a plurality of times at different moments, beams sent by the first device. In this case, the beam receiving module 701 may use, as the first beam, any one beam in the received beams sent by the first device; or use, as the first beam, a beam that has best signal quality in the received beams sent by the first device; or use, as the first beam, a specified beam in the received beams sent by the first device. More particularly, the beam receiving module 701 may use, as the first beam, a set of the plurality of received beams sent by the first device. In this case, that the beam measurement module 702 measures the first beam means measuring each beam in the first beam, where an obtained measurement quantity is an average value (which may be an arithmetic average value or a weighted average value) of measurement quantities of all the beams in the first beam.

Similar to the foregoing paragraph, the beam receiving module 701 may use, as the second beam, any one beam in received beams sent by the second device; or use, as the second beam, a beam that has best signal quality in received beams sent by the second device; or use, as the second beam, a specified beam in received beams sent by the second device. More particularly, the beam receiving module 701 may use, as the second beam, a set of a plurality of received beams sent by the second device. In this case, that the beam measurement module 702 measures the second beam means measuring each beam in the second beam, where an obtained measurement quantity is an average value (which may be an arithmetic average value or a weighted average value) of measurement quantities of all the beams in the second beam.

Particularly, in some embodiments of the present invention, a smaller measurement quantity of a beam may indicate a better beam. In this case, when the first measurement quantity and the second measurement quantity meet one or more of the following conditions: the first measurement quantity is greater than the first preset value, the second measurement quantity is less than the second preset value, or the difference between the first measurement quantity and the second measurement quantity is greater than the third preset value, the message sending module 703 may determine that the first measurement quantity and the second measurement quantity meet the preset condition.

For interaction between the inter-device coordination apparatuses separately provided in FIG. 5, FIG. 6, and FIG. 7, refer to the embodiment shown in FIG. 3. Details are not described herein.

According to the inter-device coordination apparatuses separately provided in FIG. 5, FIG. 6, and FIG. 7, the first device can determine an interfering beam, and further perform coordination with the second device, to reduce interference caused by the interfering beam. In addition, according to the apparatus provided in the embodiments of the present invention, the interference is reduced by means of coordination among the first device, the target terminal, and the second device, without statically configuring that edge-users in adjacent cells use inter-frequency resources. Therefore, inter-device interference coordination can be implemented in high-frequency cells.

Figure 8:
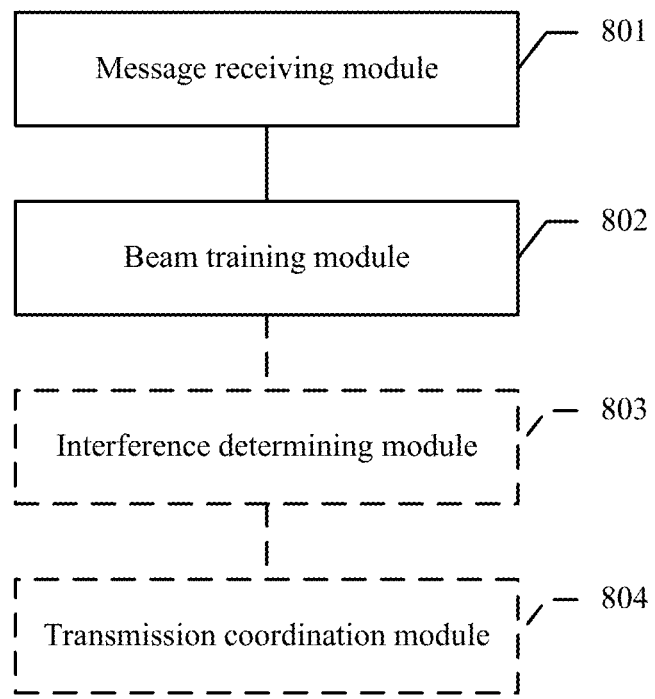
FIG. 8 is a structural diagram of an embodiment of a beam training apparatus according to an embodiment of the present invention.

An embodiment of the present invention further provides a beam training apparatus, applicable to a second device. Referring to FIG. 8, a structure of the beam training apparatus includes: a message receiving module 801 and a beam training module 802.

The message receiving module 801 is configured to receive a request message sent by a target terminal. The request message is used to indicate that the target terminal requests to perform beam training with the second device.

The beam training module 802 is configured to: after the message receiving module 801 receives the request message, perform beam training with the target terminal.

A result of the beam training performed by the beam training module 802 with the target terminal is used to determine a direction of the target terminal and further determine an interfering beam sent by the second device in the direction. An operation of determining the interfering beam may be performed by the second device, or may be performed by the target terminal. If the operation is performed by the second device, the beam training apparatus applicable to the second device further includes an optional module: an interference determining module 803.

The interference determining module 803 is configured to determine, according to a result of the beam training with the target terminal, identifier information of an interfering beam that causes interference to the target terminal. Specifically, the interference determining module 803 may determine one or more of a transmit angle for transmitting the interfering beam, a transmit matrix for transmitting the interfering beam, or identifier information of the target terminal that receives the interfering beam, or may determine information in another form. This is not limited herein. Particularly, in this step, the identifier information of the interfering beam may be alternatively determined by the target terminal, and then the interference determining module 803 obtains the identifier information from the target terminal. The identifier information, of the interfering beam, determined by the target terminal may specifically include one or more of a receiving angle at which the target terminal receives the interfering beam, a precoding matrix indicator of the interfering beam, or identifier information of the target terminal, or may be information in another form. This is not limited herein.

Optionally, the beam training apparatus further includes an optional module: a transmission coordination module 804.

The transmission coordination module 804 is configured to: after the interference determining module 803 determines the identifier information of the interfering beam that causes interference to the target terminal, adjust the interfering beam according to the determined identifier information of the interfering beam, to perform transmission coordination with a first device to reduce the interference from the interfering beam to the target terminal. Specifically, the transmission coordination module 804 may directly reduce a power of the interfering beam or disable the interfering beam. In addition, if the first device uses a serving beam to provide a service for the target terminal, the first device may determine information about a resource (including a time-frequency resource and/or a code resource) used on the serving beam, and notify the second device of the information. After determining, from the first device, the resource used on the serving beam, the transmission coordination module 804 of the second device may reduce, on the interfering beam, use of the resource used on the serving beam, such as reducing, on the interfering beam, a power of the time-frequency resource used on the serving beam, partially reducing use of the time-frequency resource and/or the code resource used on the serving beam, or not using the time-frequency resource and/or the code resource used on the serving beam. In this way, the power of the interfering beam does not need to be greatly reduced while the interference from the interfering beam to the serving beam is reduced, so that the interfering beam can still normally serve a terminal in a cell in which the second device is located.

Figure 9:
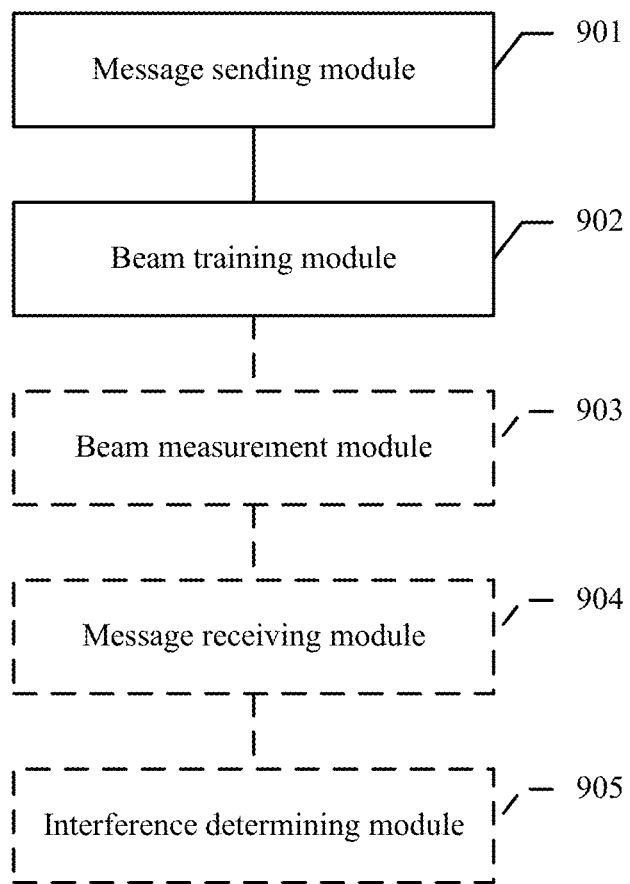
FIG. 9 is a structural diagram of another embodiment of a beam training apparatus according to an embodiment of the present invention.

Correspondingly, an embodiment of the present invention further provides a beam training apparatus applicable to a target terminal. Referring to FIG. 9, a basic structure of the beam training apparatus includes: a message sending module 901 and a beam training module 902.

The message sending module 901 is configured to send a request message to a second device. The request message is used to request to perform beam training with a second device.

The beam training module 902 is configured to: after the request message is sent, perform beam training with the second device.

It may be understood that the target terminal needs to request to perform beam training with the second device only when a beam sent by the second device causes interference to the target terminal. Therefore, the beam training apparatus applicable to the target terminal further includes an optional module: a beam measurement module 903, which is specifically configured to:

measure a serving beam, to obtain a service measurement quantity of the serving beam, where the serving beam is a beam that is used by a first device to serve the target terminal, and if the service measurement quantity is less than a first preset value, trigger the message sending module 901 to perform the step of sending a request message to a second device; or measure a received beam sent by the second device, to obtain an interference measurement quantity, and if the interference measurement quantity is greater than a second preset value, trigger the message sending module 901 to perform the step of sending a request message to a second device; or measure a serving beam, to obtain a service measurement quantity, measure a received beam sent by the second device, to obtain an interference measurement quantity, and if a difference between the service measurement quantity and the interference measurement quantity is less than a third preset value, trigger the message sending module 901 to perform the step of sending a request message to a second device.

Values of the first preset value, the second preset value, and the third preset value may be positive numbers, negative numbers, or 0, and this is not limited in this embodiment of the present invention. Alternatively, another method may be used to trigger the message sending module 901 to perform the step of sending a request message to a second device. This is not limited in this embodiment of the present invention.

The service measurement quantity is used to represent a measurement quantity of the serving beam, and the interference measurement quantity is used to represent a measurement quantity of the beam sent by the second device. A measurement quantity of a beam may be a parameter in many forms, including an RSRP, RSRQ, or a signal-to-noise ratio of the beam, or another parameter.

In the embodiment shown in FIG. 9, a larger measurement quantity indicates better signal quality of a beam. In an actual application scenario, if a smaller measurement quantity indicates better signal quality of a beam, the beam measurement module 903 may be adaptively changed, to be configured to: if the target terminal determines that the service measurement quantity is greater than the first preset value, trigger the message sending module 901 to perform the step of sending a request message to a second device; if the target terminal determines that the interference measurement quantity is less than the second preset value, trigger the message sending module 901 to perform the step of sending a request message to a second device; or if the difference between the interference measurement quantity and the service measurement quantity is less than the third preset value, trigger the message sending module 901 to perform the step of sending a request message to a second device.

Optionally, whether the beam sent by the second device causes interference to the target terminal may be determined by the first device. In this case, the beam training apparatus further includes an optional module: a message receiving module 904.

The message receiving module 904 is configured to: when receiving an indication message sent by the first device, and the indication message instructs the target terminal to perform beam training with the second device, trigger the message sending module 901 to perform the step of sending a request message to a second device.

If an operation of determining an interfering beam is performed by the target terminal, the beam training apparatus applicable to the target terminal further includes an optional module: an interference determining module 905.

The interference determining module 905 is configured to determine, according to a result of the beam training with the second device, identifier information of an interfering beam that causes interference to the target terminal. Optionally, the interference determining module is specifically configured to determine one or more of a receiving angle at which the interfering beam is received, a PMI of the interfering beam, or identifier information of the target terminal, or may determine information in another form. This is not limited herein. Particularly, the identifier information of the interfering beam may be alternatively determined by the second device, and then the interference determining module 905 obtains the identifier information from the second device. The identifier information, of the interfering beam, determined by the second device may include one or more of a transmit angle for transmitting the interfering beam, a transmit matrix for transmitting the interfering beam, or identifier information of the target terminal that receives the interfering beam, or may be information in another form. This is not limited herein.

Optionally, after the beam training apparatus determines the identifier information of the interfering beam, the message sending module 901 is further configured to:

send a first advertisement message to the second device, where the first advertisement message includes identifier information of the first device and the identifier information of the interfering beam, so that after receiving the first advertisement message, the second device can perform transmission coordination with the first device, to reduce the interference from the interfering beam to the target terminal; or send a second advertisement message to the first device, where the second advertisement message includes identifier information of the second device and the identifier information of the interfering beam, so that after receiving the second advertisement message, the first device can perform transmission coordination with the second device, to reduce the interference from the interfering beam to the target terminal.

For the transmission coordination between the first device and the second device, refer to related descriptions in FIG. 4 (*a*) and FIG. 4 (*b*). Details are not described herein again.

For interaction between the beam training apparatuses separately provided in FIG. 8 and FIG. 9, refer to related descriptions in FIG. 4 (*a*) and FIG. 4 (*b*). Details are not described herein.

In the embodiments shown in FIG. 8 and FIG. 9, the target terminal performs beam training with the second device, to determine the identifier information of the interfering beam, so that the first device and the second device can perform transmission coordination to reduce the interference caused by the interfering beam. In addition, according to the apparatus provided in the present invention, the interference is reduced by means of coordination among the first device, the target terminal, and the second device, without statically configuring that edge-users in adjacent cells use inter-frequency resources. Therefore, inter-device interference coordination can be implemented in high-frequency cells.

For application scenarios of the embodiments shown in FIG. 5 to FIG. 9, refer to an application scenario of the foregoing method. Details are not described herein.

Figure 10:
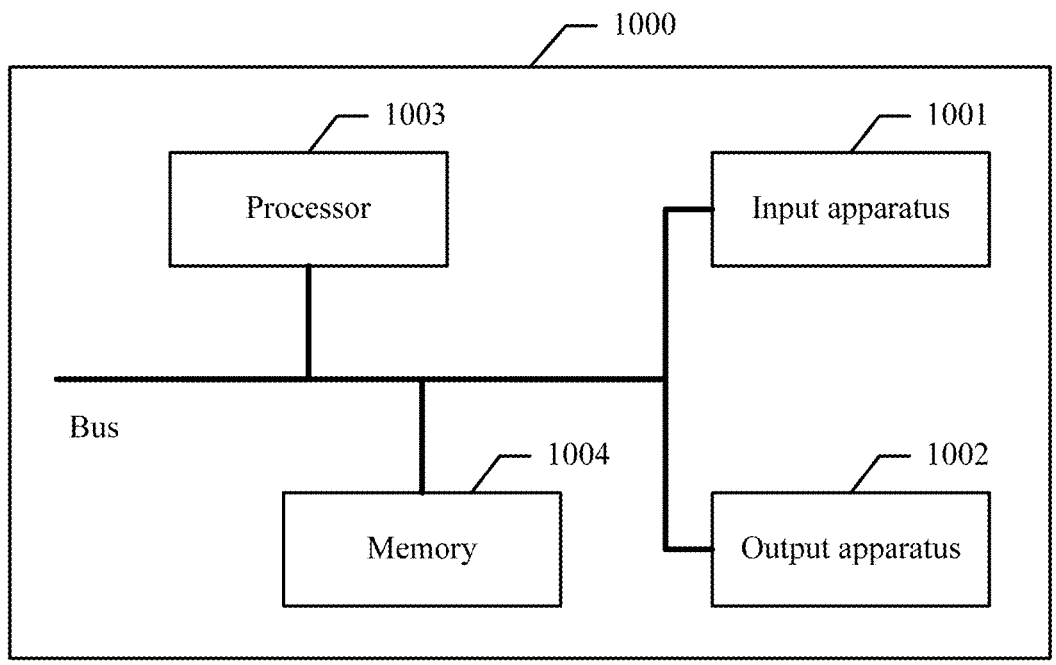
FIG. 10 is a structural diagram of another embodiment of an inter-device coordination apparatus according to an embodiment of the present invention.

The foregoing describes the inter-device coordination apparatus in the embodiments of the present invention from a perspective of a unit functional entity. The following describes the inter-device coordination apparatus in the embodiments of the present invention from a perspective of hardware processing. Referring to FIG. 10, another embodiment of an inter-device coordination apparatus 1000 applicable to a first device in an embodiment of the present invention includes:

an input apparatus 1001, an output apparatus 1002, a processor 1003, and a memory 1004 (there may be one or more processors 1003 in the inter-device coordination apparatus 1000, and one processor 1003 is used as an example in FIG. 10). In some embodiments of the present invention, the input apparatus 1001, the output apparatus 1002, the processor 1003, and the memory 1004 may be connected by using a bus or in another manner, for example, connected by using a bus in FIG. 10.

By invoking an operation instruction stored in the memory 1004, the processor 1003 is configured to perform the following steps:

sending a first beam to a target terminal;

receiving a notification message sent by the target terminal, where the notification message is used to indicate that the first beam is interfered with by a second beam sent by a second device, and the notification message includes identifier information of the second beam; and sending, to the second device according to the notification message, a coordination message that is used to request to perform transmission coordination with the second device, where the coordination message includes the identifier information of the second beam.

In some embodiments of the present invention, the coordination message further includes information about a resource used on the first beam.

Figure 11:
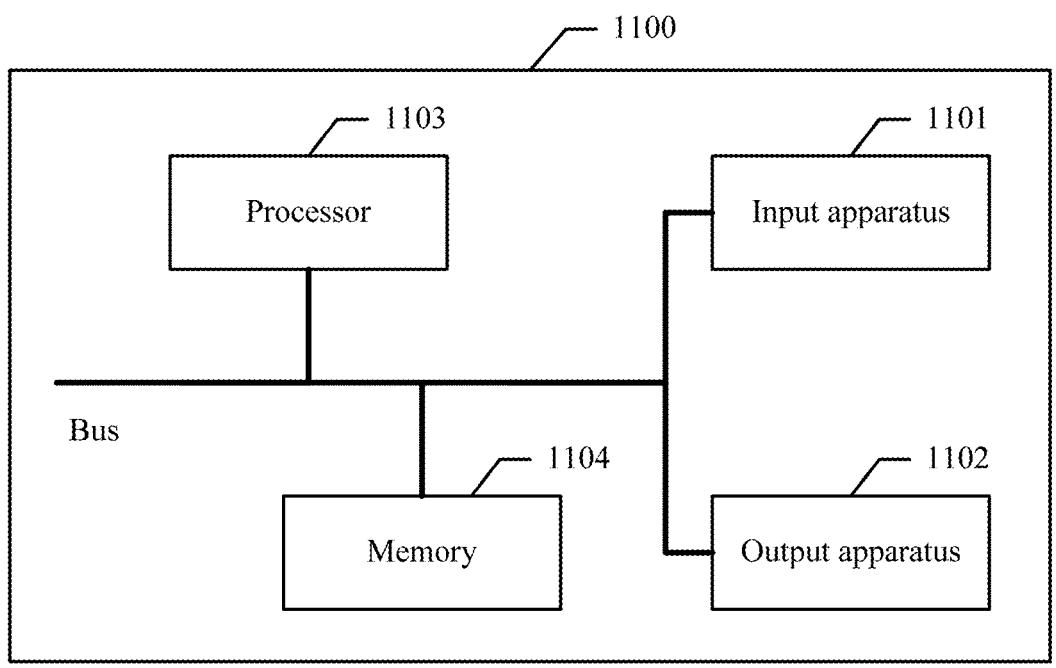
FIG. 11 is a structural diagram of another embodiment of an inter-device coordination apparatus according to an embodiment of the present invention.

Referring to FIG. 11, another embodiment of an inter-device coordination apparatus applicable to a second device in an embodiment of the present invention includes:

an input apparatus 1101, an output apparatus 1102, a processor 1103, and a memory 1104 (there may be one or more processors 1103 in an inter-device coordination apparatus 1100, and one processor 1103 is used as an example in FIG. 11). In some embodiments of the present invention, the input apparatus 1101, the output apparatus 1102, the processor 1103, and the memory 1104 may be connected by using a bus or in another manner, for example, connected by using a bus in FIG. 11.

By invoking an operation instruction stored in the memory 1104, the processor 1103 is configured to perform the following steps:

sending a second beam to a target terminal, where the second beam carries identifier information of the second beam;

receiving a coordination message from a first device, where the coordination message includes the identifier information of the second beam, and the coordination message is used to indicate that the first device requests to perform transmission coordination with the second device; and adjusting the second beam according to the coordination message, to perform transmission coordination with the first device.

In some embodiments of the present invention, the processor 1103 is further configured to perform the following steps:

reducing a power of the second beam according to the coordination message; or disabling the second beam according to the coordination message; and/or when the coordination message further includes information about a resource used on a first beam, reducing, on the second beam according to the coordination message, use of the resource used on the first beam.

Figure 12:
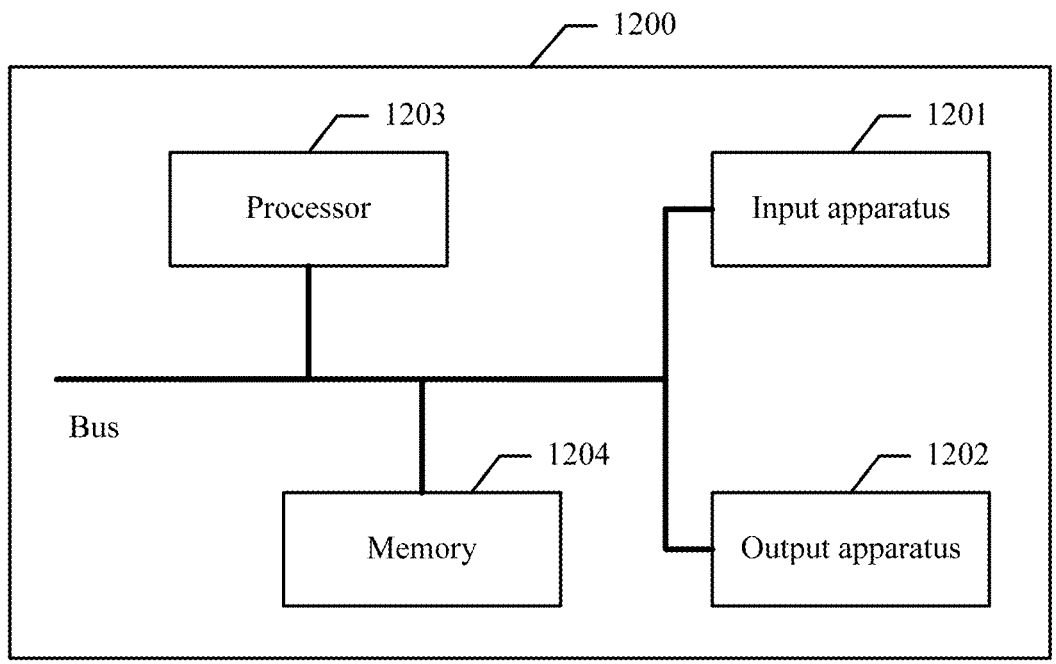
FIG. 12 is a structural diagram of another embodiment of an inter-device coordination apparatus according to an embodiment of the present invention.

Referring to FIG. 12, another embodiment of an inter-device coordination apparatus applicable to a target terminal in an embodiment of the present invention includes:

an input apparatus 1201, an output apparatus 1202, a processor 1203, and a memory 1204 (there may be one or more processors 1203 in an inter-device coordination apparatus 1200, and one processor 1203 is used as an example in FIG. 12). In some embodiments of the present invention, the input apparatus 1201, the output apparatus 1202, the processor 1203, and the memory 1204 may be connected by using a bus or in another manner, for example, connected by using a bus in FIG. 12.

By invoking an operation instruction stored in the memory 1204, the processor 1203 is configured to perform the following steps:

receiving a first beam sent by a first device, and measuring the first beam, to obtain a first measurement quantity;

receiving a second beam sent by a second device, and measuring the second beam, to obtain a second measurement quantity, where the second beam carries identifier information of the second beam; and if the first measurement quantity and the second measurement quantity meet a preset condition, sending a notification message to the first device, where the notification message includes the identifier information of the second beam.

In some embodiments of the present invention, that the first measurement quantity and the second measurement quantity meet a preset condition includes:

the first measurement quantity is less than a first preset value; and/or the second measurement quantity is greater than a second preset value; and/or a difference between the first measurement quantity and the second measurement quantity is less than a third preset value.

In some embodiments of the present invention, the first beam includes any one of the following beams: any one beam in polling beams that are received by the target terminal and are sent by the first device, a beam that has best signal quality in polling beams that are received by the target terminal and are sent by the first device, or a specified beam in polling beams that are received by the target terminal and are sent by the first device; or the first beam is specifically a set of a plurality of polling beams that are received by the target terminal and are sent by the first device, where the first measurement quantity is an average value of measurement quantities of beams in the first beam.

Figure 13:
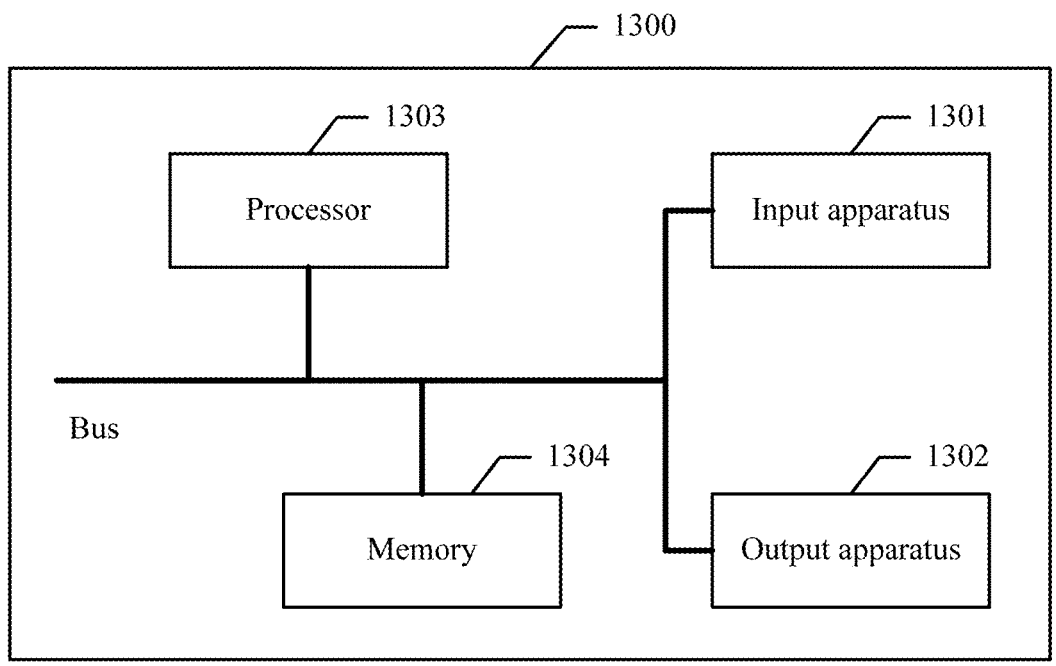
FIG. 13 is a structural diagram of another embodiment of a beam training apparatus according to an embodiment of the present invention.

Referring to FIG. 13, another embodiment of a beam training apparatus applicable to a second device in an embodiment of the present invention includes:

an input apparatus 1301, an output apparatus 1302, a processor 1303, and a memory 1304 (there may be one or more processors 1303 in a beam training apparatus 1300, and one processor 1303 is used as an example in FIG. 13). In some embodiments of the present invention, the input apparatus 1301, the output apparatus 1302, the processor 1303, and the memory 1304 may be connected by using a bus or in another manner, for example, connected by using a bus in FIG. 13.

By invoking an operation instruction stored in the memory 1304, the processor 1303 is configured to perform the following steps:

receiving a request message sent by a target terminal, where the request message is used to indicate that the target terminal requests to perform beam training with the second device; and after receiving the request message, performing beam training with the target terminal.

In some embodiments of the present invention, the processor 1303 is further configured to perform the following step:

determining, according to a result of the beam training with the target terminal, identifier information of an interfering beam that causes interference to the target terminal.

In some embodiments of the present invention, the processor 1303 is further configured to perform the following steps:

determining a transmit angle at which the second device transmits the interfering beam; and/or determining a transmit matrix used by the second device to transmit the interfering beam; and/or determining identifier information of the target terminal that receives the interfering beam; and/or receiving, from the target terminal, the identifier information of the interfering beam.

In some embodiments of the present invention, the processor 1303 is further configured to perform the following step:

adjusting the interfering beam according to the determined identifier information of the interfering beam, to perform transmission coordination with a first device.

In some embodiments of the present invention, the processor 1303 is further configured to perform the following steps:

reducing a power of the interfering beam; or disabling the interfering beam; and/or when the first device communicates with the target terminal by using a serving beam, determining, by the processor 1303 from the first device, information about a resource used on the serving beam, and reducing, on the interfering beam, use of the resource used on the serving beam.

Figure 14:
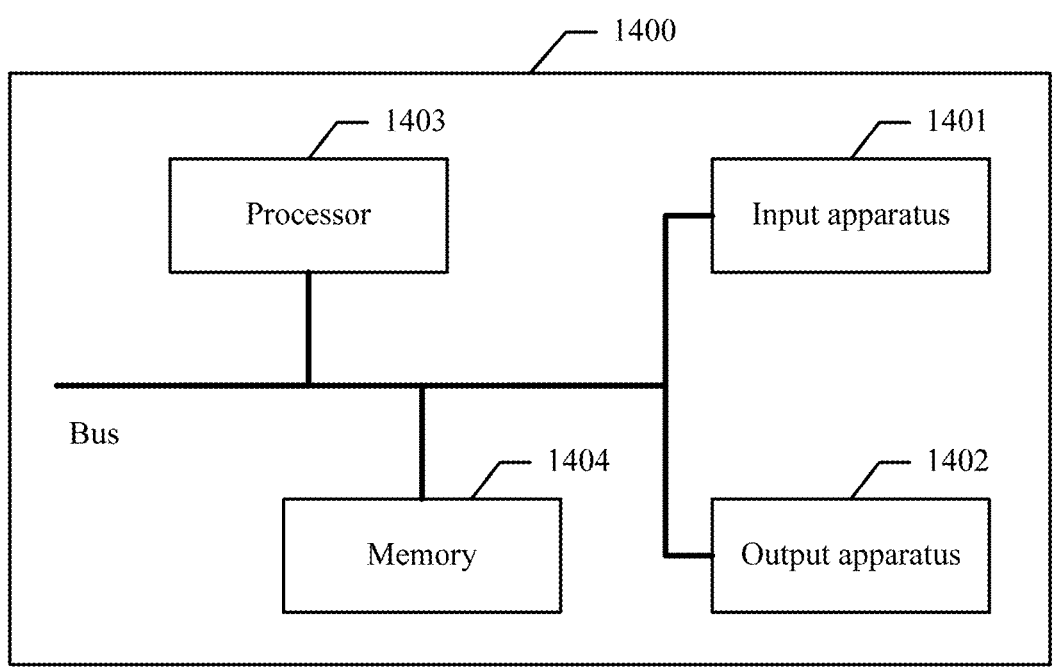
FIG. 14 is a structural diagram of another embodiment of a beam training apparatus according to an embodiment of the present invention.

Referring to FIG. 14, another embodiment of a beam training apparatus applicable to a target terminal in an embodiment of the present invention includes:

an input apparatus 1401, an output apparatus 1402, a processor 1403, and a memory 1404 (there may be one or more processors 1403 in a beam training apparatus 1400, and one processor 1403 is used as an example in FIG. 14). In some embodiments of the present invention, the input apparatus 1401, the output apparatus 1402, the processor 1403, and the memory 1404 may be connected by using a bus or in another manner, for example, connected by using a bus in FIG. 14.

By invoking an operation instruction stored in the memory 1404, the processor 1403 is configured to perform the following steps:

sending a request message to a second device, where the request message is used to request to perform beam training with the second device; and after sending the request message, performing beam training with the second device.

In some embodiments of the present invention, the processor 1403 is further configured to perform the following steps:

measuring a serving beam, to obtain a service measurement quantity; and if determining that the service measurement quantity is less than a first preset value, triggering the step of sending a request message to a second device; or measuring a received beam sent by the second device, to obtain an interference measurement quantity; and if determining that the interference measurement quantity is greater than a second preset value, triggering the step of sending a request message to a second device; or measuring a serving beam, to obtain a service measurement quantity, measuring a received beam sent by the second device, to obtain an interference measurement quantity, and if a difference between the service measurement quantity and the interference measurement quantity is less than a third preset value, triggering the step of sending a request message to a second device; or if receiving an indication message sent by a first device, and the indication message is used to instruct to perform beam training with the second device, triggering the step of sending a request message to a second device.

In some embodiments of the present invention, the processor 1403 is further configured to perform the following step:

determining, according to a result of the beam training with the second device, identifier information of an interfering beam that causes interference to the target terminal.

In some embodiments of the present invention, the processor 1403 is further configured to perform the following steps:

determining a receiving angle at which the target terminal receives the interfering beam; and/or determining a precoding matrix indicator PMI of the interfering beam; and/or determining identifier information of the target terminal; and/or receiving, from the second device, the identifier information of the interfering beam.

In some embodiments of the present invention, the processor 1403 is further configured to perform the following step:

sending a first advertisement message to the second device, where the first advertisement message includes identifier information of the first device and the identifier information that is of the interfering beam and that is determined by the target terminal; or sending a second advertisement message to the first device, where the second advertisement message includes identifier information of the second device and the identifier information that is of the interfering beam and that is determined by the target terminal.

The present invention further provides a related device, including one or more of the inter-device coordination apparatus shown in FIG. 5, the inter-device coordination apparatus shown in FIG. 6, the beam training apparatus shown in FIG. 8, the inter-device coordination apparatus shown in FIG. 10, the inter-device coordination apparatus shown in FIG. 11, or the beam training apparatus shown in FIG. 13.

The present invention further provides a related terminal, including one or more of the inter-device coordination apparatus shown in FIG. 7, the beam training apparatus shown in FIG. 9, the inter-device coordination apparatus shown in FIG. 12, or the beam training apparatus shown in FIG. 14.

The present invention further provides a wireless communications system, including the device and terminal described in the foregoing two paragraphs.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is only an example. For example, the unit division is only logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in a form of a software product. The software product is stored in a storage medium and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are only intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. An apparatus, applied to a first device in a wireless communications system, wherein the first device is configured to provide a service for a target terminal in the wireless communications system, and the apparatus comprising:
a communication interface circuit, configured to:
send a first beam to the target terminal;
receive a notification message from the target terminal, wherein the notification message is used to indicate that the first beam is interfered with by a second beam sent by a second device, and the notification message comprises identifier information of the second beam; and
send, to the second device according to the notification message, a coordination message that is used to request to perform transmission coordination with the second device, wherein the coordination message comprises the identifier information of the second beam, wherein the coordination message further comprises information about a resource used on the first beam of the first device to allow the second device to reduce on the second beam, according to the received coordination message, use of the resource used on the first beam.

2. An apparatus, applied to a second device in a wireless communications system, the apparatus comprising:
a communication interface circuit, configured to:
send a second beam to the target terminal, wherein the second beam carries identifier information of the second beam, and
receive a coordination message from a first device, wherein the coordination message comprises the identifier information of the second beam, and the coordination message is used to indicate that the first device requests to perform transmission coordination with the second device; and
a processor, configured to adjust the second beam according to the coordination message, to perform transmission coordination with the first device, wherein
the coordination message further comprises information about a resource used on a first beam of the first device and the processor is further configured to reduce, on the second beam of the second device according to the coordination message, use of the resource used on the first beam.

3. The apparatus according to claim 2, wherein the processor is configured to:
reduce a power of the second beam according to the coordination message; or
disable the second beam according to the coordination message.

4. An apparatus, applied to a target terminal in a wireless communications system, the apparatus comprising:
a communication interface circuit, configured to receive a first beam sent by a first device;
a processor, configured to measure the first beam, to obtain a first measurement quantity, wherein
the communication interface circuit is further configured to receive a second beam sent by a second device, wherein the second beam carries identifier information of the second beam; and
the processor is further configured to measure the second beam, to obtain a second measurement quantity; and
the communication interface circuit, configured to: when the first measurement quantity and the second measurement quantity meet a preset condition, send a notification message to the first device, wherein the notification message comprises the identifier information of the second beam.

5. The apparatus according to claim 4, wherein the preset condition comprises:
the first measurement quantity is less than a first preset value; and/or
the second measurement quantity is greater than a second preset value; and/or
a difference between the first measurement quantity and the second measurement quantity is less than a third preset value.

6. The apparatus according to claim 4, wherein the first beam comprises any one of the following beams: any one beam in polling beams that are received by the communication interface circuit and are sent by the first device, a beam that has best signal quality in polling beams that are received by the communication interface circuit and are sent by the first device, or a specified beam in polling beams that are received by the communication interface circuit and are sent by the first device; or the first beam is a set of a plurality of polling beams that are received by the communication interface circuit and are sent by the first device, wherein the first measurement quantity is an average value of measurement quantities of beams in the first beam.

* * * * *